United States Patent
Hattori

(10) Patent No.: US 7,581,017 B2
(45) Date of Patent: Aug. 25, 2009

(54) DATA TRANSMISSION SYSTEM, DATA TRANSMISSION APPARATUS, DATA RECEPTION APPARATUS, AND DATA TRANSMISSION METHOD

(75) Inventor: Toshikazu Hattori, Yokohama (JP)

(73) Assignee: Panasonic Corporation, Osaka (JP)

( * ) Notice: Subject to any disclaimer, the term of this patent is extended or adjusted under 35 U.S.C. 154(b) by 1027 days.

(21) Appl. No.: 10/496,128

(22) PCT Filed: Nov. 22, 2002

(86) PCT No.: PCT/JP02/12231

§ 371 (c)(1),
(2), (4) Date: May 20, 2004

(87) PCT Pub. No.: WO03/045033

PCT Pub. Date: May 30, 2003

(65) Prior Publication Data

US 2004/0267951 A1    Dec. 30, 2004

(30) Foreign Application Priority Data

Nov. 22, 2001  (JP) ............................ 2001-358082

(51) Int. Cl.
*G06F 15/16* (2006.01)
(52) U.S. Cl. .................... 709/232; 709/234; 709/235
(58) Field of Classification Search .............. 709/231, 709/232, 233, 234, 235
See application file for complete search history.

(56) References Cited

U.S. PATENT DOCUMENTS

| | | | |
|---|---|---|---|
| 4,517,644 A * | 5/1985 | Hamada et al. ............. 709/251 |
| 4,558,428 A * | 12/1985 | Matsumura et al. ......... 709/251 |
| 4,764,941 A | 8/1988 | Choi | |
| 5,206,937 A * | 4/1993 | Goto ........................... 709/209 |
| 5,414,813 A * | 5/1995 | Shiobara ..................... 709/245 |
| 5,677,931 A * | 10/1997 | Okuyama et al. ........... 375/260 |
| 5,745,704 A * | 4/1998 | Yasukawa .................... 709/250 |
| 5,751,954 A * | 5/1998 | Saito ........................... 709/245 |
| 5,923,662 A | 7/1999 | Stirling et al. | |
| 7,181,299 B2 * | 2/2007 | Osakabe et al. ............... 700/94 |

FOREIGN PATENT DOCUMENTS

| | | |
|---|---|---|
| JP | 61-126840 | 6/1986 |
| JP | 64-2432 | 1/1989 |
| JP | 64-002432 | 1/1989 |
| JP | 9-107373 | 4/1997 |
| JP | 2000-149461 | 5/2000 |

* cited by examiner

*Primary Examiner*—Saleh Najjar
*Assistant Examiner*—Marie Georges Henry
(74) *Attorney, Agent, or Firm*—Wenderoth, Lind & Ponack, L.L.P.

(57) ABSTRACT

A data transmission system maintaining synchronization between transmission and reception even when a transmission apparatus, a reception apparatus and a transmission path do not operate on the same clock. Specifically, data packet is obtained by omitting a preamble and/or a parity from data generated by a data generation means and by adding a data length field and spare bits. The obtained data packet is set as an access unit and is transmitted from a transmission apparatus to a transmission path. A reception apparatus adds, to the received data, the preamble and/or the parity to reconstruct data, and adjusts a rate of a data reading clock for transmitting data from a reception-side buffer means to a data processing means a the basis of an accumulated amount in a clock control means.

51 Claims, 24 Drawing Sheets

Fig.3 (a) source code

Fig.3 (b) bit clock

Fig.3 (c) channel code

Fig.3 (d) symbol clock

Fig.4

| preamble type | the last slot of the previous sub-frame | |
|---|---|---|
| | 0 | 1 |
| Z : channel 1 and a head of a block | 11101000 | 00010111 |
| X : channel 1 and other than a head of a block | 11100010 | 00011101 |
| Y : channel 2 | 11100100 | 00011011 |

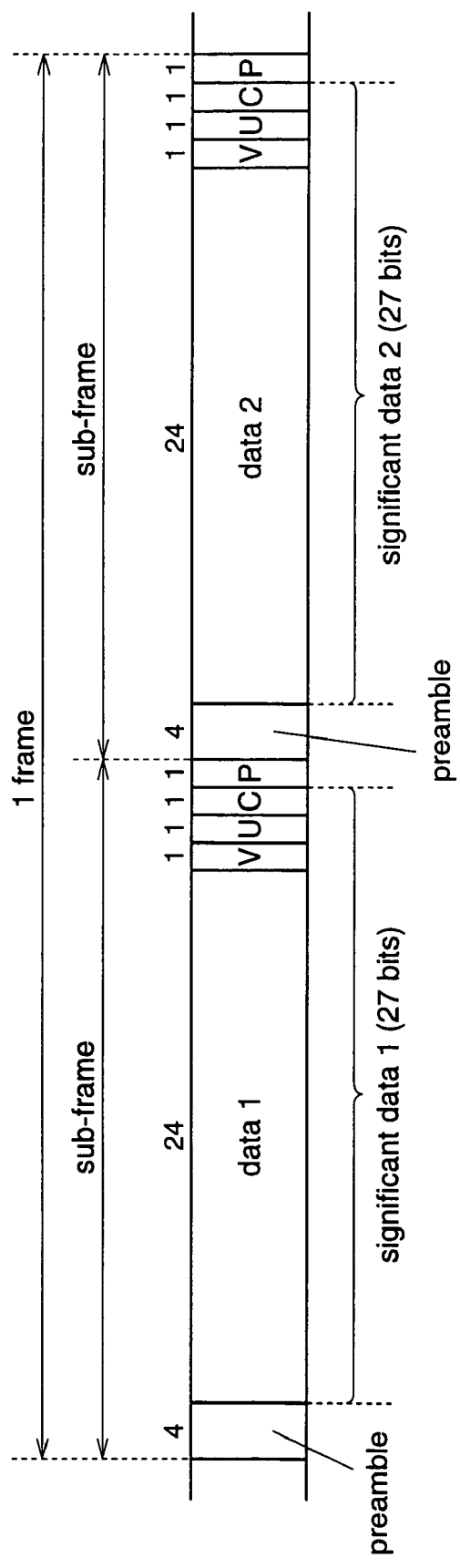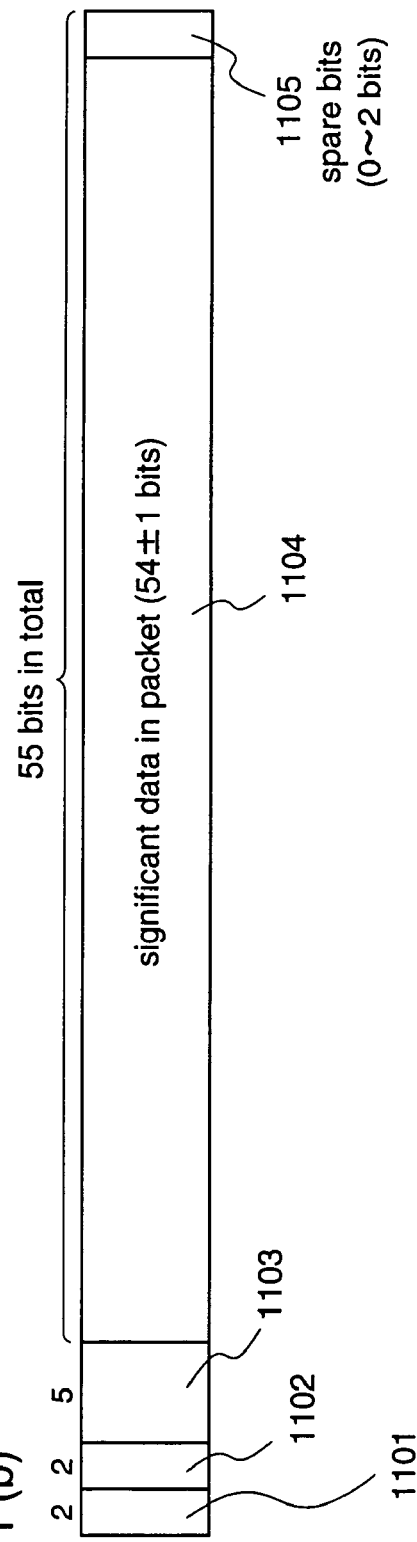

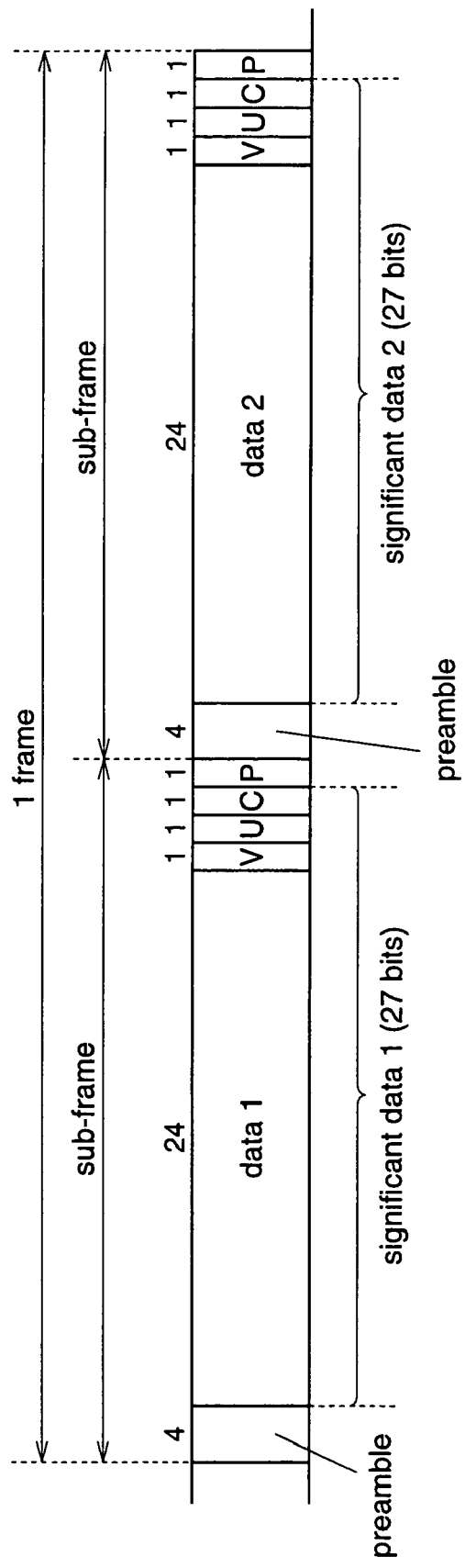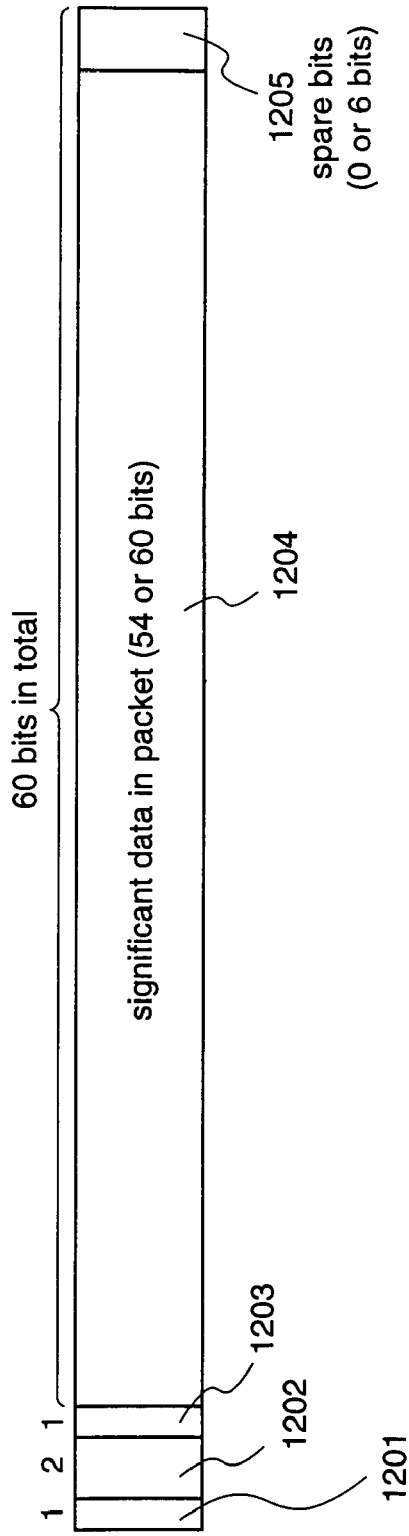
Fig.12 (a)
Fig.12 (b)

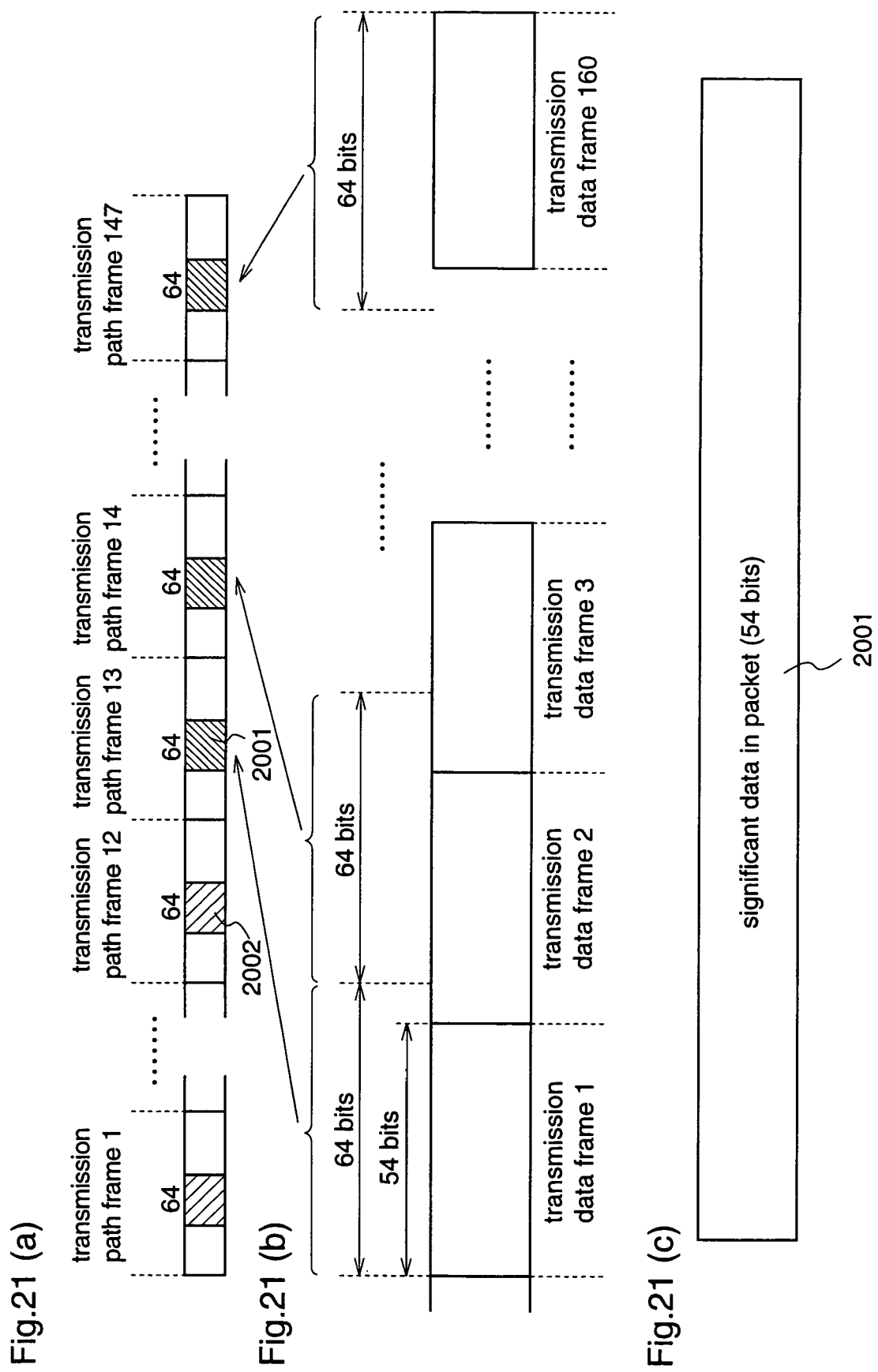

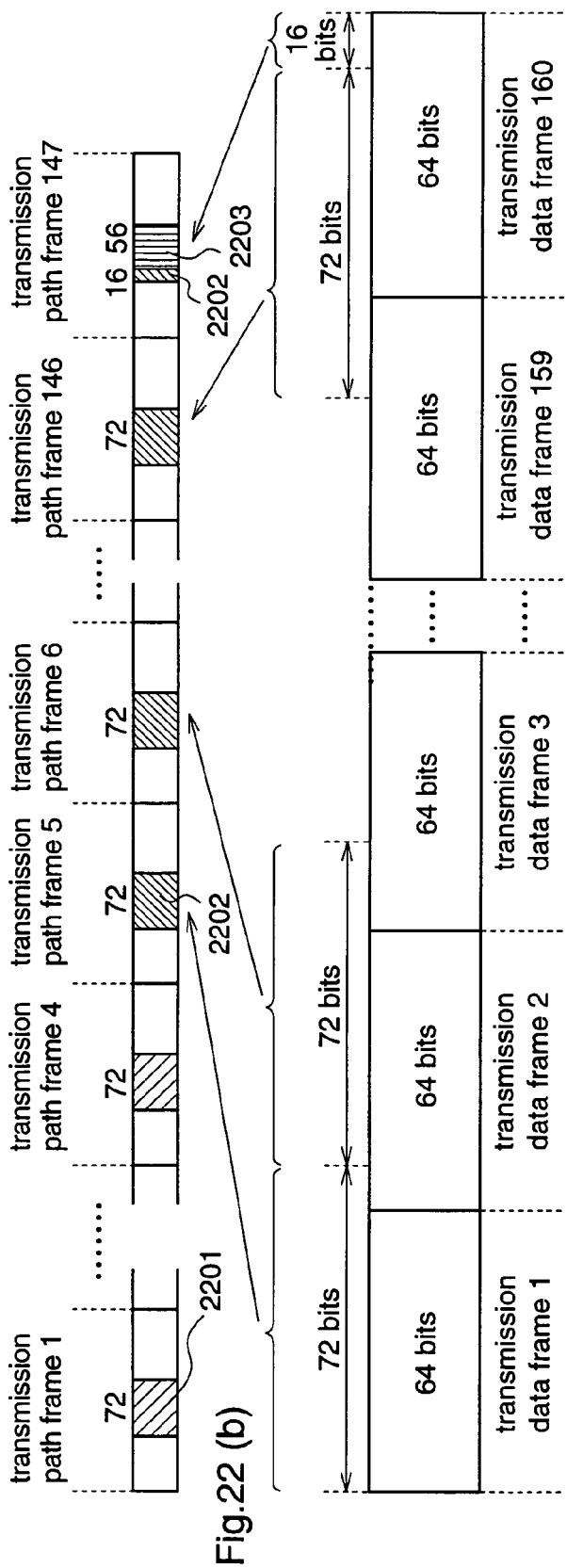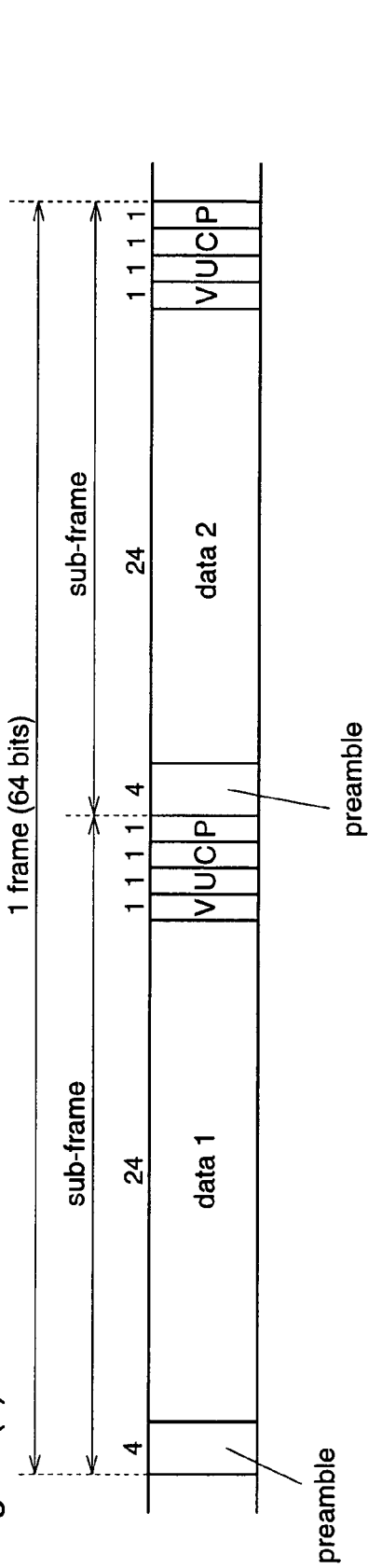

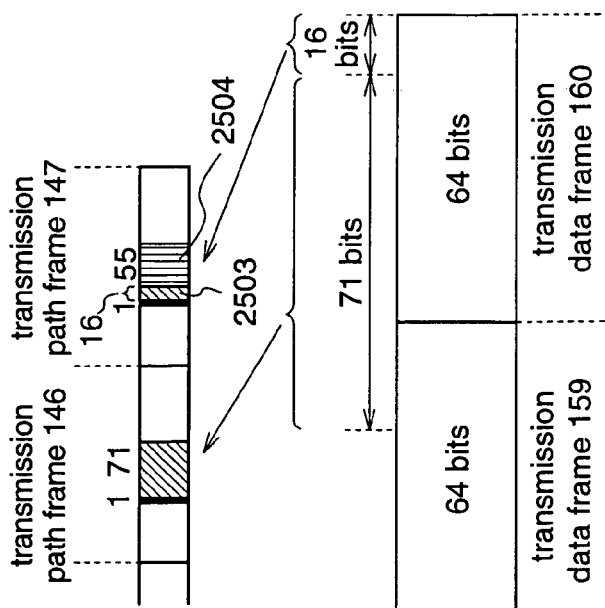
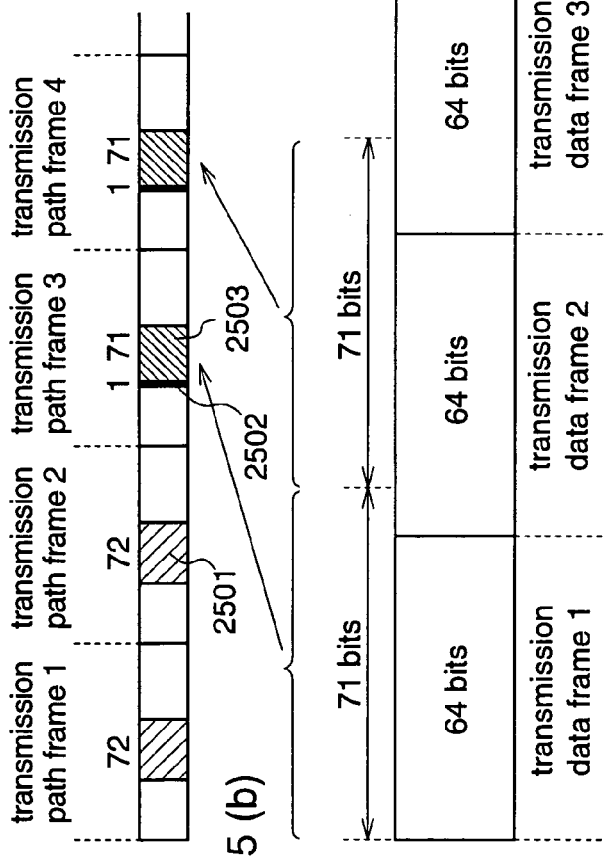
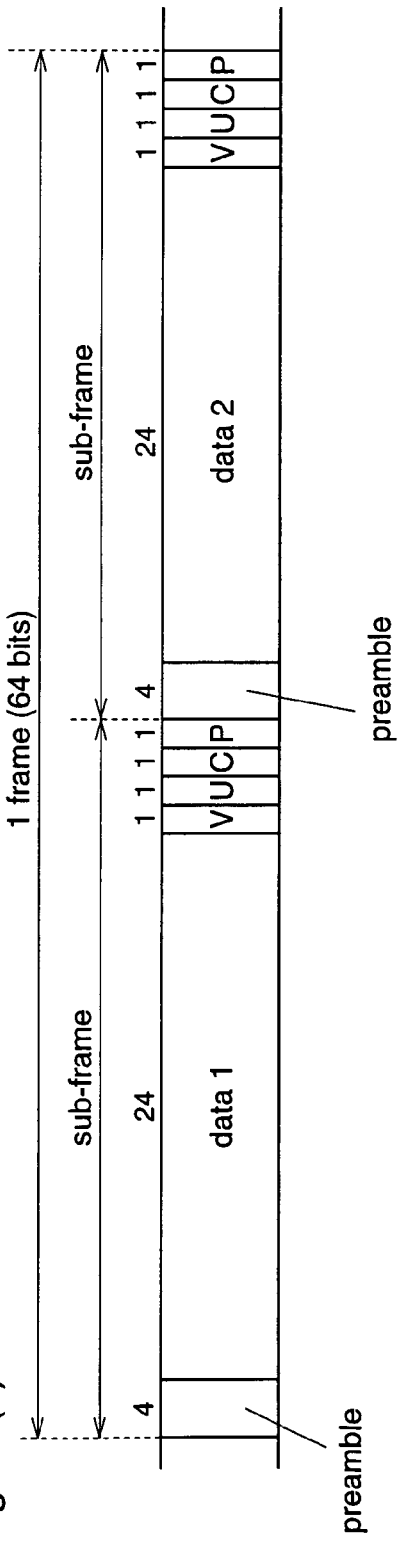

DATA TRANSMISSION SYSTEM, DATA TRANSMISSION APPARATUS, DATA RECEPTION APPARATUS, AND DATA TRANSMISSION METHOD

BACKGROUND OF THE INVENTION

1. Field of the Invention

The present invention relates to a data transmission system in which a transmission path is shared by a plurality of communication apparatuses and which performs data transmission using synchronous channels, as well as a data transmission method, a data transmission apparatus, and a data reception apparatus, and particularly relates to the system, method and apparatuses which achieve synchronization of operations between the transmission apparatus and reception apparatus connected to each other via the transmission path.

2. Background of the Related Art

In recent years, the study of the communication method for transmitting, via a common bus, digital data such as digitized video, audio data, computer data and the like is eagerly made. A conventional transmission system, for example, the communication system disclosed in Japanese Published Patent Application No. Hei. 9-107373, will be described as an example, using FIG. 14. In FIG. 14, reference numeral 100 denotes a transmission path, and numeral 101 denotes a clock control means for controlling a clock of the transmission path 100. Further, reference numeral 1410 denotes a transmission apparatus comprising a data generation means 1411 and a first communication control means 112, and reference numeral 1420 denotes a reception apparatus comprising a data processing means 1421 and a second communication control means 122.

Hereinafter, the operation will be described.

The transmission system shown in FIG. 14 transmits data from the transmission apparatus 1410 to the reception apparatus 1420 via the transmission path 100. The transmission path 100 operates on the basis of a clock which is controlled by the clock control means 101, and the first communication control means 112 in the transmission apparatus 1410 and the second communication control means 122 in the reception apparatus 1420, which are connected to the transmission path 100, extract the clock when receiving data from the transmission path 100, and utilizes the clock for data processing inside.

The transmission apparatus 1410 inputs the extracted clock to the data generation means 1411. The data generation means 1411 generates transmission data using the input clock and transmits the transmission data to the first communication control means 112. The first communication control means 112 outputs the transmission data to the transmission path 100.

In the reception apparatus 1420, the second communication control means 122 receives the transmission data and transmits the same to the data processing means 1421. Further, the second communication control means 122 simultaneously extracts the clock and transmits the clock to the data processing means 1421. The data processing means 1421 uses the extracted clock to process the transmission data.

In the procedure described above, the data generation in the data generation means 1411 and the data processing in the data processing means 1421 are performed by using the same clock, and thereby synchronization between the transmission apparatus 1410 and the reception apparatus 1420 can be achieved and the transmission system performs operation without failure.

The network as described above is used for the vehicle-mounted multimedia network MOST (Media Oriented Systems Transport) using optical fiber for transmission, and the like, and the network and an apparatus connected thereto operate by synchronizing clocks thereof, thereby reducing buffers and the like to be incorporated into the apparatus to attempt reduction in costs or facilitation of connection of various apparatuses to the network.

Moreover, as for the network (IEEE1394) transmission of IEC60958 (i.e., "IEC60958-1 First edition 1999-12") format, for example, a demodulation apparatus and a signal processor which receive the IEC60958 format data and demodulate the data in a transmission apparatus is disclosed in Japanese Published Patent Application No. 2000-149461.

As described above, in the conventional data transmission system, and data transmission method, the transmission apparatus 1410, reception apparatus 1420, and transmission path 100 operates on the same clock to perform data generation and processing, thereby maintaining synchronization between transmission and reception.

However, in the conventional construction described above, when the data generation means 1411 on the side of the transmission apparatus 1410 has a specific clock and transmits the transmission data on the basis of the specific clock, or in a system where while a clock source of the data generation means 1411 and a clock source of the transmission path 100 are the same, the transmission apparatus 1410 and the transmission path 100 operate, respectively, on the clocks of different rates in specifications, there is a problem that the synchronization in data processing cannot be achieved.

Further, in a system where, while the data generation means 1411 and the transmission path 100 operate on the clock of the same rate in specifications, asynchronization is exactly caused due to clock sources thereof being different from each other, there is a problem that an overflow or underflow of the transmission data occurs in the transmission apparatus 1410 during the operation of the data transmission system.

The present invention is made to solve the above-described problems, and an object of the present invention is to provide a data transmission system, data transmission apparatus, data reception apparatus, and data transmission method which can maintain synchronization between transmission and reception even when the transmission apparatus, reception apparatus, and transmission path do not operate on the same clock.

BRIEF DESCRIPTION OF THE INVENTION

The data transmission system according to a first aspect of the present invention is a data transmission system in which one or more transmission apparatus and one or more reception apparatus are connected to each other via a transmission path and data are transmitted from the transmission apparatus to the reception apparatus with using an access unit which emerges at certain time intervals and is allocated for the transmission path, wherein the transmission apparatus comprises a data packet generation means for receiving transmission data which is composed of consecutive data frames and has a format which includes a preamble indicating a start of the data frame, or a parity for detecting an error in the data frame, or both of them, and omitting the preamble, or the parity, or both of them, from one or more data frames included in the transmission data received within the certain time intervals, adding to this resultant a data length field indicating the number of bits of significant data, and setting the remaining spare portion as spare bits, thereby generating a data packet composing the access unit over its entire length, and the reception apparatus comprises a data extraction means for receiving the access unit, and adding the preamble, or the parity, or both of them, which have been omitted by the data packet generation means, thereby reconstructing the data frame.

Therefore, even when there is a difference between a clock rate of the transmission path and a clock used for the processing inside the transmission apparatus, the clock difference can be absorbed by adjusting the spare bit length, thereby realizing synchronization in operations between the transmission apparatus and the reception apparatus.

Further, according to the data transmission system of a second aspect of the present invention, in the data transmission system as defined in the first aspect, the reception apparatus comprises: a buffer means for temporarily accumulating the data frames reconstructed by the data extraction means, and a buffer control means for monitoring the accumulated data amount in the buffer means and adjusting a data reading rate from the buffer means in accordance with the increase or decrease in the accumulated data amount.

Therefore, the reception apparatus can perform data processing at the same clock rate as that of the transmission apparatus, thereby realizing the synchronization of the system.

Further, according to the data transmission system of a third aspect of the present invention, in the data transmission system as defined in the first aspect, the transmission apparatus comprises a time-information generation means for generating a time based on a clock of the transmission data, and the data packet generation means also adds the time-information as well as the data length field and sets the remaining spare portion as spare bits, thereby composing the access unit over the entire length, and the reception apparatus comprises: a buffer means for temporarily accumulating the data frames reconstructed by the data extraction means, a clock control means for reproducing the time generated by the transmission apparatus by using the time-information which the data extraction means read from within the access unit constructed by the data packet generation means, and a buffer control means for adjusting a data reading rate from the buffer means based on a clock which is synchronized with a time reproduced by the clock control means.

Therefore, even when there is a difference between a clock of the transmission data and a clock of the transmission path, the reception apparatus reads the time-information created from the clock on the side of the transmission apparatus and adjusts the data reading rate, thereby realizing synchronization of the system.

Further, according to the data transmission system of a fourth aspect of the present invention, in the data transmission system as defined in the first or second aspects of the invention, the data packet generation means also adds a preamble location pointer indicating a location of the first preamble in the data frame, and a type of the preamble of the data frame, the preamble being indicated by the preamble location pointer, as well as the data length field, and setting the remaining spare portion as spare bits, thereby constructing the access unit over the entire length.

Therefore, even when the transmission data gets disconnected halfway during transmitting transmission data from the transmission apparatus via the transmission path, reconstruction of a frame on the side of the reception apparatus can be easily realized with using information indicating the location pointer and the type of the preamble, which is added to the transmission data.

Further, according to the data transmission system of a fifth aspect of the present invention, in the data transmission system as defined in any of the first to fourth aspects of the invention, the transmission data format includes a specific field having a value specific to an application, the data packet generation means also omits the specific field as well as the preamble, or the parity, or both of them, and the data extraction means also adds the specific field as well as the preamble, or the parity, or both of them, thereby reconstructing the data frame.

Therefore, by omitting unnecessary data for data transmission, data which can be transmitted for each packet via the transmission path can be effectively utilized, and the reception apparatus adds the omitted data to reconstruct the data frame, thereby demodulating the transmission data properly.

Further, according to the data transmission system of a sixth aspect of the present invention, in the data transmission system as defined in any of the first to fifth aspects of the invention, the data length field indicates the number of bits of spare bits.

Thereby, when packetizing the transmission data, it is possible to secure a field into which an application can be arbitrarily written.

Further, the data transmission system according to a seventh aspect of the present invention is a data transmission system in which one or more transmission apparatus and one or more reception apparatus are connected to each other via a transmission path and data are transmitted from the transmission apparatus to the reception apparatus with using an access unit which emerges at certain time intervals and is allocated for the transmission path, wherein the transmission apparatus comprises a data packet generation means for receiving transmission data which is composed of consecutive data frames and has a data transfer rate, a relationship of an integer ratio being established between the data transfer rate and a data transfer rate allocated for the transmission path, grouping into a processing unit a plurality of the data frames of the received transmission data and corresponding to a period equal to an integral multiple of the time intervals at which the access unit emerges, dividing the processing unit into transmission path frames each of which is the data amount which can be accommodated in the access unit, thereby generating a data packet composing the access unit including the transmission path frame, and the reception apparatus comprises a data extraction means for receiving the access unit, reconstructing the processing unit from one or more of the received access units, and further reconstructing the consecutive data frames.

Therefore, in a case where transmission data are transmitted without being omitted because of, for example, the preamble and the like being unable to be omitted from the transmission data, even when there is a difference between a clock rate of the transmission path and a clock rate used for the processing inside the transmission apparatus, it is possible to absorb the clock difference by grouping a plurality of data frames into a processing unit, dividing the same into the transmission path frames respectively, and transmitting the same divided for each access unit including the transmission path frame. Further, it is possible to reconstruct the data frames from the access units on the side of the reception apparatus, thereby realizing the synchronization of the system.

Further, according to the data transmission system of an eighth aspect of the present invention, in the data transmission system as defined in the seventh aspect of the invention, the data packet generation means enters one or more bits of synchronization data indicating a start of the processing unit into one or more access units, and the data extraction means detects the starting location of the processing unit by receiving the synchronization data.

Therefore, a data start location of the transmitted data can be easily detected.

Further, according to the transmission system of a ninth aspect of the present invention, in the data transmission system as defined in the eighth aspect of the invention, the data packet generation means enters one or more bits of discrimination data which are different from a value of the synchronization data, which discrimination data indicate that the synchronization data are not included in the access unit, into position in the access unit in which the synchronization data are not entered.

Therefore, error detection of the frame including synchronization data can be eliminated, performing more reliable transmission.

Further, the data transmission system according to a tenth aspect of the present invention is a data transmission system in which one or more transmission apparatus and one or more reception apparatus are connected to each other via a transmission path and data are transmitted from the transmission apparatus to the reception apparatus with using an access unit which emerges at certain time intervals and is allocated for the transmission path, wherein the transmission apparatus comprises a data packet generation means for receiving transmission data which is composed of consecutive data frames, has a data transfer rate, a relationship of an integer ratio being established between the data transfer rate and a data transfer rate allocated for the transmission path, and has a format including a preamble indicating a start of the data frame, or a parity for detecting an error in the data frame, or both of them, omitting the preambles, or the parities, or both of them, from a plurality of the data frames of the received transmission data and corresponding to a period equal to an integral multiple of the time intervals at which the access unit emerges to set the resultant as one processing unit, dividing the processing unit into transmission path frames each of which is the data amount which can be accommodated in the access unit, thereby generating a data packet composing the access unit including the transmission path frame, and the reception apparatus comprises a data extraction means for receiving the access unit, reconstructing the processing unit from one or more of the received access units, and further adding the preambles, or the parities, or both of them, which have been omitted by the data packet generation means, thereby reconstructing the data frames.

Therefore, even when there is a difference between a clock rate of the transmission path and a clock rate used for the processing inside the transmission apparatus, unnecessary data for transmitting transmission data are omitted and packetization into transmission data packet is performed, and thereafter the transmission is made for each of the access units and thereby the clock difference can be absorbed. Further the reception apparatus extracts the transmission data packet from an access unit of data received, and adds, to the transmission data packet, the data which have been omitted at the transmission, thereby reconstructing the data frame and realizing the synchronization between the apparatuses in the system.

Further, according to the data transmission system of an eleventh aspect of the present invention, in the data transmission system as defined in the tenth aspect of the invention, the data packet generation means enters one or more bits of synchronization data indicating a start of the processing unit into one or more access units, and the data extraction means detects the starting location of the processing unit by receiving the synchronization data.

Therefore, a data start location of the transmitted data can be easily detected.

Further, according to the data transmission system of a twelfth aspect of the present invention, in the data transmission system as defined in the eleventh aspect of the invention, the data packet generation means enters one or more bits of discrimination data which are different from a value of the synchronization data, which discrimination data indicate that the synchronization data are not included in the access unit, into position in the access unit in which the synchronization data are not entered.

Therefore, error detection of the frame including synchronization data can be eliminated, performing more reliable transmission.

Further, according to the data transmission system of a thirteenth aspect of the present invention, in the data transmission system as defined in any of the tenth to twelfth aspects of the invention, the transmission data format includes a specific field having a value specific to an application, and the data packet generation means also omits the specific field as well as the preamble, or the parity, or both of them, and the data extraction means also adds the specific field as well as the preamble, or the parity, or both of them, thereby reconstructing the data frame.

Therefore, by omitting unnecessary data for data transmission, data which can be transmitted for each packet via the transmission path can be effectively utilized, and further the reception apparatus adds the omitted data to reconstruct data frames, thereby demodulating transmission data properly.

Further, according to the data transmission system of a fourteenth aspect of the present invention, in the data transmission system as defined in any of the first to sixth and tenth to thirteenth aspects of the invention, the transmission data format is a format defined by IEC60958.

Therefore, the transmission data in format defined by IEC60958 can be transmitted from the transmission apparatus to the reception apparatus via the transmission path with maintaining the synchronization.

Further, according to the data transmission system of a fifteenth aspect of the present invention, in the data transmission system as defined in any of the first to fourteenth aspects of the invention, the transmission path is a serial bus.

Therefore, data can be more quickly transmitted via the transmission path.

Further, the data transmission apparatus according to a sixteenth aspect of the present invention is a data transmission apparatus connected to a transmission path, which transmits data with using an access unit allocated for the transmission path, and the data transmission apparatus comprises a data packet generation means for receiving transmission data which is composed of consecutive data frames and has a format which includes a preamble indicating a start of the data frame, or a parity for detecting an error in the data frame, or both of them, omitting the preamble or the parity, or both of them, from one or more data frames included in the transmission data transmitted with using the access unit, adding to this resultant a data length field indicating the number of bits of significant data, and setting the remaining spare portion as spare bits, thereby generating a data packet composing the access unit over its entire length.

Therefore, a preamble or a parity, or both of them, which are not involved in the data processing, are omitted, and instead thereof, a field indicating the number of significant data bits required for data reproduction and spare bits for adjusting the transmission rate are added to the data to be transmitted.

Further, according to the data transmission apparatus of a seventeenth aspect of the present invention, the data transmission apparatus as defined in the sixteenth aspect of the invention comprises a time-information generation means for generating a time based on a clock of the transmission data, and in the data transmission apparatus the data packet generation means also adds the time-information as well as the data length field, and sets the remaining spare portion as spare bits, thereby generating a data packet composing an access unit over its entire length.

Therefore, even when there is a difference between a clock of the transmission data and a clock of the transmission path, time-information created from the clock on the side of the transmission apparatus is transmitted, thereby realizing the synchronization of the system on the basis of the time-information.

Further, according to the data transmission apparatus of an eighteenth aspect of the present invention, in the data transmission apparatus as defined in the sixteenth aspect of the invention, the data packet generation means also adds a preamble location pointer indicating a location of the first preamble in the data frame, and a type of the preamble of the data frame, the preamble being indicated by the preamble location pointer, as well as the data length field, and sets the remaining spare portion as spare bits, thereby generating a data packet composing the access unit over its entire length.

Therefore, when the transmission data are transmitted via the transmission path from the transmission apparatus, even if the transmission data gets disconnected halfway, the reception apparatus can easily realize reconstruction of a frame by using information indicating the location pointer and the type of the preamble, which is added to the transmission data transmitted from the transmission apparatus.

Further, according to the data transmission apparatus of a nineteenth aspect of the present invention, in the data transmission apparatus as defined in any of the sixteenth to eighteenth aspects of the invention, the transmission data format includes a specific field having a value specific to an application, and the data packet generation means also omits the specific field as well as the preamble, or the parity, or both of them.

Therefore, by omitting unnecessary data for data transmission, data which can be transmitted for each packet via the transmission path can be effectively utilized.

Further, according to the data transmission apparatus of a twentieth aspect of the present invention, in the data transmission apparatus as defined in any of the sixteenth to nineteenth aspects of the invention, the data length field indicates the number of bits of spare bits.

Thereby, when packetizing the transmission data, it is possible to secure a field into which an application can be arbitrarily written.

Further, the data transmission apparatus according to a twenty-first aspect of the present invention is a data transmission apparatus connected to a transmission path, which transmits data with using an access unit which emerges at certain time intervals and is allocated for the transmission path, and the data transmission apparatus comprises a data packet generation means for receiving transmission data which is composed of consecutive data frames and has a data transfer rate, a relationship of an integer ratio being established between the data transfer rate and a data transfer rate allocated for the transmission path, grouping into a processing unit a plurality of the data frames of the received transmission data and corresponding to a period equal to an integral multiple of the time intervals at which the access unit emerges, dividing the processing unit into transmission path frames each of which is the data amount which can be accommodated in the access unit, thereby generating a data packet composing the access unit including the transmission path frame.

Therefore, even when the transmission data are transmitted without being omitted because of, for example, the preamble and the like being unable to be omitted from the transmission data, the difference in clock between the transmission apparatus and the transmission path is absorbed, thereby realizing synchronization.

Further, according to the data transmission apparatus of a twenty-second aspect of the present invention, in the data transmission apparatus as defined in the twenty-first aspect of the invention, the data packet generation means enters one or more bits of synchronization data indicating a start of the processing unit into one or more access units.

Therefore, transmission data having a data start location which can be easily detected can be obtained.

Further, according to the data transmission apparatus of a twenty-third aspect of the present invention, in the data transmission apparatus as defined in the twenty-second aspect of the invention, the data packet generation means enters one or more bits of discrimination data which are different from a value of the synchronization data, which discrimination data indicate that the synchronization data are not included in the access unit, into position in the access unit in which the synchronization data are not entered.

Therefore, more reliable transmission data whose frame including synchronization data can be prevented from being erroneously detected can be obtained.

Further, the data transmission apparatus according to a twenty-fourth aspect of the present invention is a data transmission apparatus connected to a transmission path, which transmits data with using an access unit which emerges at certain time intervals and is allocated for the transmission path, and the data transmission apparatus comprises a data packet generation means for receiving transmission data which is composed of consecutive data frames, has a data transfer rate, a relationship of an integer ratio being established between the data transfer rate and a data transfer rate allocated for the transmission path, and has a format including a preamble indicating a start of the data frame, or a parity for detecting an error in the data frame, or both of them, omitting the preambles, or the parities, or both of them, from a plurality of the data frames of the received transmission data and corresponding to a period equal to an integral multiple of the time intervals at which the access unit emerges to set the resultant as one processing unit, dividing the processing unit into transmission path frames each of which is the data amount which can be accommodated in the access unit, thereby generating a data packet composing the access unit including the transmission path frame.

Therefore, even when there is a difference between a clock rate of the transmission path and a clock used for the processing inside the transmission apparatus, unnecessary data for transmitting transmission data are omitted to be packetized, and then the transmission is made for every number of bits of the access unit allocated for the transmission path, thereby absorbing the clock difference.

Further, according to the data transmission apparatus of a twenty-fifth aspect of the present invention, in the data transmission apparatus as defined in the twenty-fourth aspect of the invention, the data packet generation means enters one or more bits of synchronization data indicating a start of the processing unit into one or more access units.

Therefore, the transmission data having a data start location which can be easily detected can be obtained.

Further, according to the data transmission apparatus of a twenty-sixth aspect of the present invention, in the data transmission apparatus as defined in the twenty-fifth aspect of the invention, the data packet generation means enters one or more bits of discrimination data which are different from a value of the synchronization data, which discrimination data indicate that the synchronization data are not included in the access unit, into position in the access unit in which the synchronization data are not entered.

Therefore, more reliable transmission data whose frame including synchronization data can be prevented from being erroneously detected can be obtained.

Further, according to the data transmission apparatus of a twenty-seventh aspect of the present invention, in the data transmission apparatus as defined in any of the twenty-fourth to twenty-sixth aspects of the invention, the transmission data format includes a specific field having a value specific to an application, and the data packet generation means also omits the specific field as well as the preamble, or the parity, or both of them.

Therefore, by omitting unnecessary data for data transmission, data which can be transmitted for each packet via the transmission path can be effectively utilized.

Further, according to the data transmission apparatus of a twenty-eighth aspect of the present invention, in the data transmission apparatus as defined in any of the sixteenth to twentieth and twenty-fourth to twenty-seventh aspects of the invention, the transmission data format is a format defined by IEC60958.

Therefore, the transmission data in the format defined by IEC60958 can be transmitted via the transmission path to the side of reception apparatus with maintaining synchronization.

Further, according to the data transmission apparatus of a twenty-ninth aspect of the present invention, in the data transmission apparatus as defined in any of the sixteenth to twenty-eighth aspects of the invention, the transmission path is a serial bus.

Therefore, data can be more quickly transmitted via the transmission path.

Further, the data reception apparatus according to a thirtieth aspect of the present invention is a data reception apparatus which is connected to a transmission path and receives a data packet obtained by omitting the preamble, or the parity, or both of them, from one or more data frames included in the transmission data which are transmitted with using an access unit which emerges at certain time intervals and is allocated for the transmission path, adding to this resultant a data length field indicating the number of bits of significant data, setting the remaining spare portion as spare bits and composing the access unit over its entire length, and the data reception apparatus comprises a data extraction means for receiving the access unit and adding thereto the preamble of the transmission data, or the parity thereof, or both of them, which have been omitted, thereby reconstructing the data frame.

Therefore, data having a format in which a preamble or a parity, or both of them, of the transmission data, which have been omitted at the transmission are restored, can be reproduced.

Further, according to the data reception apparatus of a thirty first aspect of the present invention, the data reception apparatus, as defined in the thirtieth aspect of the invention, comprises: a buffer means for temporarily accumulating the reconstructed data frames, and a buffer control means for monitoring the accumulated data amount in the buffer means and adjusting a data reading rate from the buffer means in accordance with the increase or decrease in the accumulated data amount.

Therefore, by adjusting data reading rate, the data processing can be performed at the same clock rate as that of the transmission apparatus, thereby realizing synchronization of the system.

Further, according to the data reception apparatus of a thirty-second aspect of the present invention, the data reception apparatus as defined in the thirtieth aspect of the invention, comprises: a buffer means for temporarily accumulating the reconstructed data frames, a clock control means for reproducing a time with using time-information which the data extraction means read from within the constructed access unit, and a buffer control means for adjusting a data reading rate from the buffer means based on a clock which is synchronized with a time reproduced by the clock control means.

Therefore, even when there is a difference between a clock of the transmission data and a clock of the transmission path, the time-information created from the clock on the side of the transmission apparatus is received and read, and the data reading rate is adjusted on the basis of the time-information, thereby realizing synchronization of the system.

Further, the data reception apparatus according to a thirty-third aspect of the present invention is a data reception apparatus which is connected to a transmission path and which receives a data packet obtained by omitting preambles each indicating a start of a data frame, or parities for detecting errors in the data frames, or both of them, from a plurality of data frames corresponding to a period equal to an integral multiple of time intervals at which the access unit emerges, which data frames are transmitted with using the access unit which emerges at certain time intervals and is allocated for the transmission path, to set the resultant as one processing unit, and dividing the processing unit into transmission path frames each of which is the data amount which can be accommodated in the access unit, and composing the access unit including the transmission path frame, and the data reception apparatus comprises a data extraction means for receiving the access unit, reconstructing the processing unit from one or more of the received access units, adding to the processing unit the omitted preamble or parity, or both of them, thereby reconstructing the data frame.

Therefore, the received data are separated into transmission data packets and the data which have been omitted at the transmission are added to the transmission data packet, reproducing data having a format in which a preamble or a parity, or both of them, of the transmission data, which have been omitted at the transmission, are restored.

Further, according to the data reception apparatus of thirty-fourth aspect of the present invention, in the data reception apparatus as defined in the thirty-third aspect of the present invention, the data extraction means detects the starting location of the processing unit by receiving one or more access units including one or more bits of synchronization data indicating the start of the processing unit.

Therefore, a data start location of the transmitted data can be easily detected.

Further, according to the data reception apparatus of a thirty-fifth aspect of the present invention, in the data reception apparatus as defined in any of the thirtieth to thirty-fourth aspects of the present invention, the transmission data format includes a specific field having a value specific to an application, and the data extraction means adds the specific field as well as the preamble, or the parity, or both of them, according to a data frame of the transmission data, thereby reconstructing the data frame.

Therefore, the transmission data can be properly demodulated, thereby realizing synchronization of the system.

Further, according to the data reception apparatus of a thirty-sixth aspect of the present invention, in the data reception apparatus as defined in any of the thirtieth to thirty-fifth aspects of the present invention, the transmission data format is a format defined by IEC60958.

Therefore, transmission data in the format defined by IEC60958 can be received via the transmission path with maintaining synchronization with the transmission apparatus.

Further, according to the data reception apparatus of a thirty-seventh aspect of the present invention, in the data reception apparatus as defined in any of the thirtieth to thirty-sixth aspects of the present invention, the transmission path is a serial bus.

Therefore, the transmission data can be more quickly received via the transmission path.

Further, the data transmission method according to a thirty-eighth aspect of the present invention comprises a data packet generation step of omitting a preamble indicating a start of a data frame, or a parity for detecting an error in the data frame, or both of them, from one or more data frames included in the transmission data which is composed of consecutive data frames and has a format which includes the preamble, or the parity, or both of them, adding to this resultant a data length field indicating the number of bits of significant data of the frame, and setting the remaining spare portion as spare bits, and composing an access unit allocated for the transmission path over the entire length, thereby transmitting the access unit to the transmission path, and a data extraction step of receiving the access unit and adding to the access unit the preamble or the parity, or both of them, which have been omitted in the data packet generation step, thereby reconstructing the data frame.

Therefore, even when there is a difference between a clock rate of the transmission path and a clock used for the processing inside the transmission apparatus, the clock difference can be absorbed by adjusting the spare bit length, and further the reception apparatus adds the data which have been omitted at the transmission, and can perform the data processing at the same clock rate as that of the transmission apparatus by adjusting the data reading rate, thereby realizing synchronization of the system.

Further, according to the data transmission method of a thirty-ninth aspect of the present invention, in the data transmission method as defined in the thirty-eighth aspect of the present invention, the transmission data format includes a specific field having a value specific to an application, and the data packet generation step omits the specific field as well as the preamble, or the parity, or both of them, and the data extraction step also adds the specific field as well as the preamble, or the parity, or both of them, thereby reconstructing a frame.

Therefore, by omitting unnecessary data for data transmission, data which can be transmitted for each packet via the transmission path can be effectively utilized. Further, the reception apparatus adds the omitted data to reconstruct data frame and thereby transmission data can be demodulated properly, and therefore synchronization of the system can be realized.

Further, the data transmission method according to a fortieth aspect of the present invention comprises: a data packet generation step of receiving transmission data which has a data transfer rate, a relationship of an integer ratio being established between the data transfer rate and a data transfer rate allocated for a transmission path, and which transmission data is composed of consecutive data frames, grouping into a processing unit a plurality of the data frames of the received transmission data and corresponding to a period equal to an integral multiple of time intervals at which the access unit emerges, dividing the processing unit into transmission path frames each of which is the data amount which can be accommodated in the access unit, thereby generating a data packet composing the access unit including the transmission path frame, and a data extraction step of receiving the access unit, reconstructing the processing unit from one or more of the received access units, and further reconstructing the consecutive data frames.

Therefore, in a case where transmission data are transmitted without being omitted because of, for example, the preamble and the like being unable to be omitted from the transmission data, even when there is a difference between a clock rate of the transmission path and a clock rate used for the processing inside the transmission apparatus, it is possible to absorb the clock difference by grouping a plurality of data frames into a processing unit, dividing the same into the transmission path frames respectively, and transmitting the same divided for each access unit including the transmission path frame. Further, it is possible to reconstruct the data frame from the processing units on the side of the reception apparatus, thereby realizing synchronization between the apparatuses in the system.

Further, the data transmission method according to a forty-first aspect of the present invention comprises: a data packet generation step of receiving transmission data which has a data transfer rate, a relationship of an integer ratio being established between the data transfer rate and a data transfer rate allocated for a transmission path, and which transmission data is composed of consecutive data frames and has a format including a preamble indicating a start of the data frame, or a parity for detecting an error in the data frame, or both of them, omitting the preamble, or the parity, or both of them, from a plurality of the data frames of the received transmission data and corresponding to a period equal to an integral multiple of time intervals at which the access unit emerges to set the resultant as one processing unit, dividing the processing unit into transmission path frames each of which is the data amount which can be accommodated in the access unit, thereby generating a data packet composing the access unit including the transmission path frame, and a data extraction step of receiving the access unit, reconstructing the processing unit from one or more of the received access units, adding to the processing unit the preamble, or the parity, or both of them, which have been omitted in the data packet generation step, thereby reconstructing the data frame.

Therefore, even when there is a difference between a clock rate of the transmission path and a clock used for the processing inside the transmission apparatus, unnecessary data for transmitting the transmission data are omitted and packetization is performed and thereafter transmission is made for every number of bits of the access unit allocated for the transmission path, thereby absorbing the clock difference. Further, the reception apparatus reconstructs the data frame from the processing unit, thereby realizing synchronization between apparatuses in the system.

Further, according to the data transmission method of a forty-second aspect of the present invention, in the data transmission method as defined in the forty-first aspect of the present invention, the transmission data format includes a specific field having a value specific to an application, and the data packet generation step omits the specific field as well as the preamble, or the parity, or both of them, and the data extraction step also adds the specific field as well as the preamble, or the parity, or both of them, thereby reconstructing a frame.

BRIEF DESCRIPTION OF THE DRAWINGS

FIG. 3 is a diagram illustrating an example of bi-phase modulation.

FIG. 4 is a diagram illustrating a preamble in IEC60958.

FIG. 11 is a diagram illustrating a packet construction used in a data transmission system according to a third embodiment of the present invention.

FIG. 12 is a diagram illustrating a packet construction used in a data transmission system according to a fourth embodiment of the present invention.

FIG. 21 is a diagram illustrating a method of transmitting transmission data frames in the data transmission system according to the seventh embodiment of the present invention.

FIG. 22 is a diagram illustrating a method of transmitting transmission data frames in a data transmission system according to an eighth embodiment of the present invention.

FIG. 25 is a diagram illustrating a method of transmitting transmission data frames in a data transmission system according to a ninth embodiment of the present invention.

DETAILED DESCRIPTION OF THE INVENTION

Embodiment 1

Figure 1:
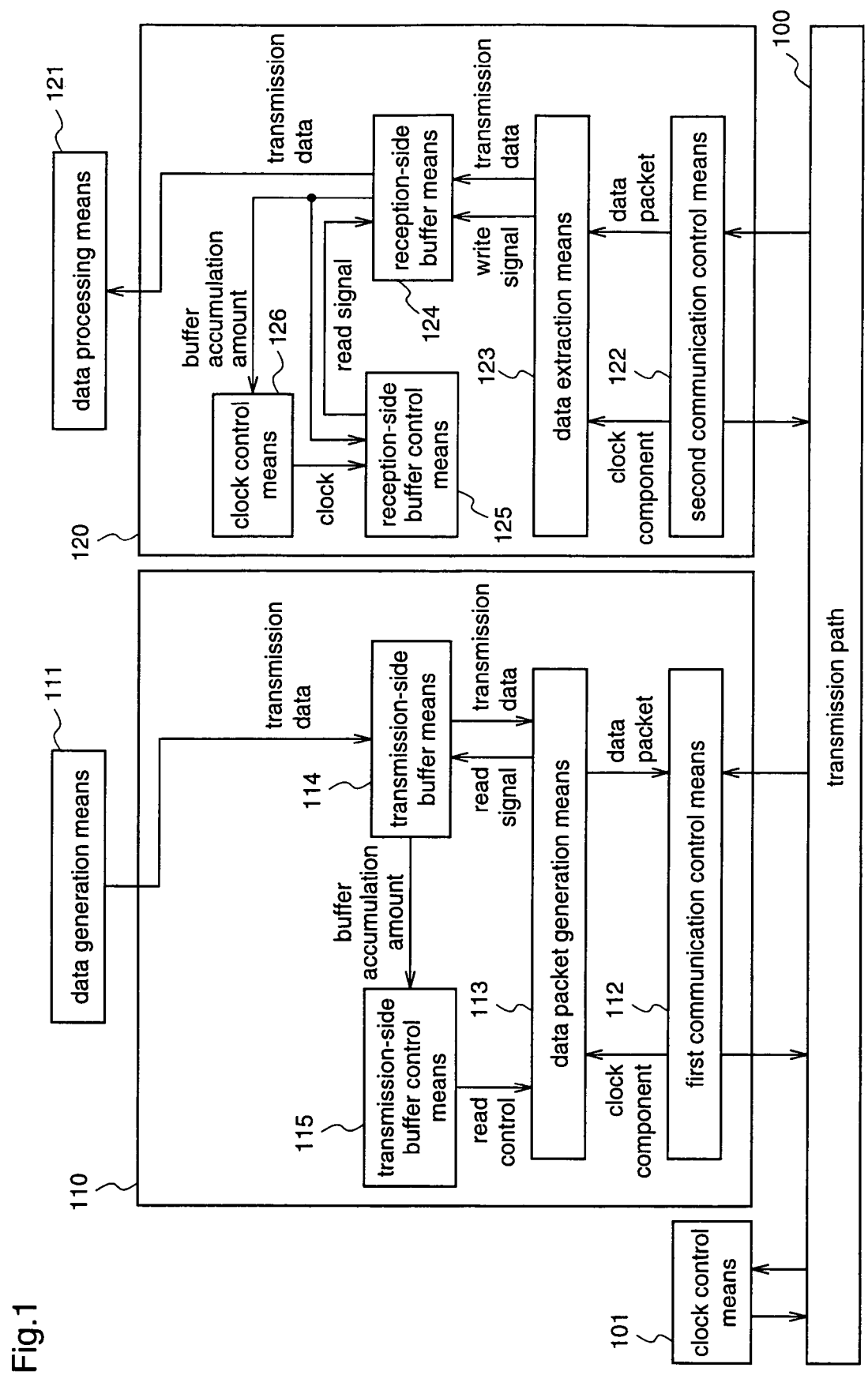
FIG. 1 is a block diagram illustrating a configuration of a data transmission system according to embodiments of the present invention.

A configuration of a data transmission system in a first embodiment of the present invention is shown in FIG. 1. In FIG. 1, reference numeral 100 denotes a transmission path, and numeral 101 denotes a clock control means for controlling a clock of the transmission path 100. Further, reference numeral 110 denotes a transmission apparatus, and numeral 120 denotes a reception apparatus. The transmission apparatus 110 comprises a data generation means 111, a first communication control means 112, a data packet generation means 113, a transmission-side buffer means 114, and a transmission-side buffer control means 115. Further, the reception apparatus 120 comprises a data processing means 121, a second communication control means 122, a data extraction means 123, a reception-side buffer means 124, and a reception-side buffer control means 125, and a clock control means 126.

Figure 2:
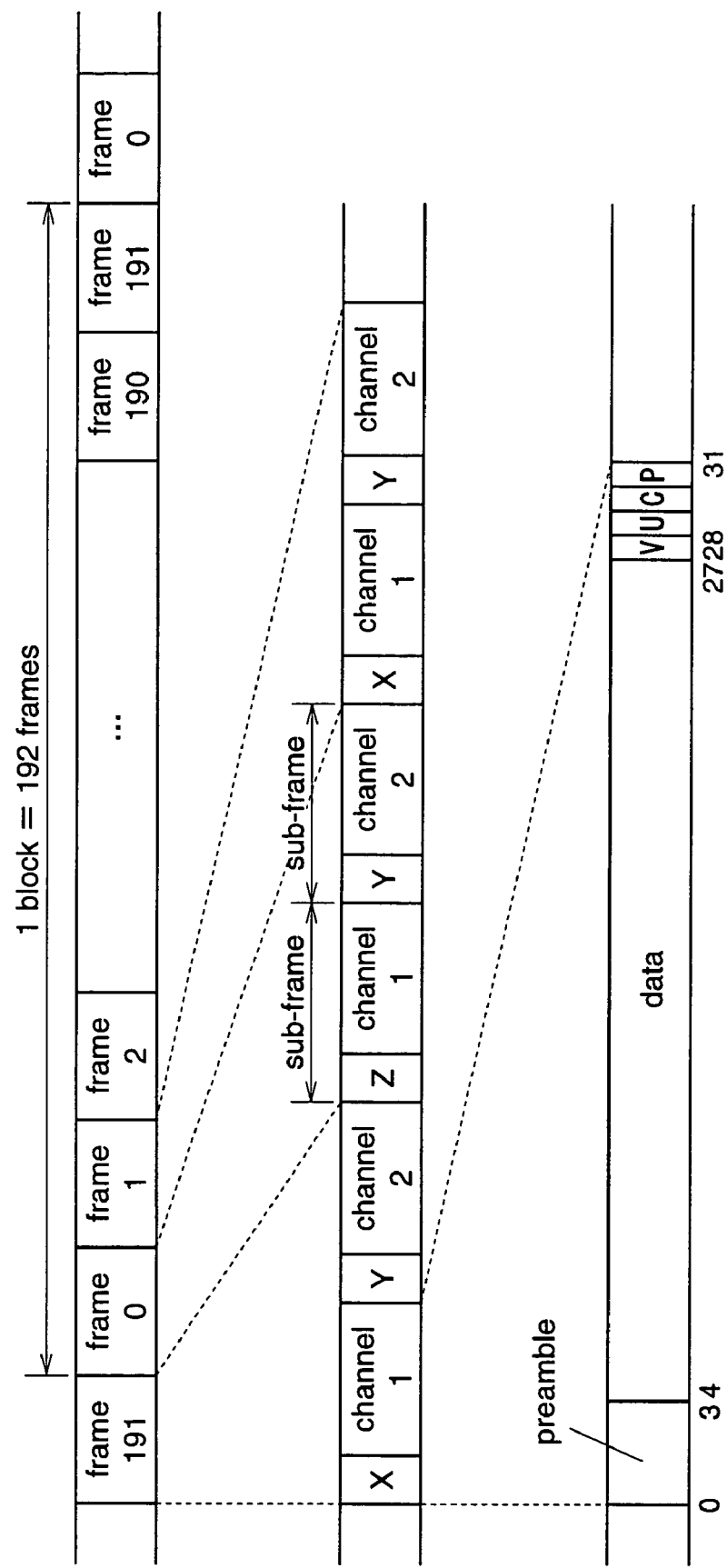
FIG. 2 is a diagram illustrating an IEC60958 format.

In this first embodiment, the transmission data are transmitted in a format defined by IEC60958 (i.e. "IEC60958-1 First edition 1999-12") from the data generation means 111. FIG. 2 is a diagram illustrating the IEC60958 format. As shown in FIG. 2, 1 frame is composed of 2 sub-frames in IEC60958 and further, 1 sub-frame is composed of 32 time slots. Then, slots 0 to 3 are for signals for synchronization discrimination, which are called preambles, and slots 4 to 27 are slots allocated for data transmission, on which 24 bits of data can be transmitted in 1 sub-frame. Further, slot 28 is for a flag indicating reliability of audio data in the sub-frame (validity flag), slot 29 is for user data which can be freely set by a user, slot 30 is for a channel status information, and slot 31 is a check bit (parity bit) of 28 bit data length excluding the preamble part.

The bits of the slots 4 to 31 are subjected to bi-phase mark modulation for dividing 1 slot into 2 symbols for representation, and transmitted. An example of the bi-phase modulation is shown in FIG. 3. As shown in FIG. 3, a state of the symbol is always inverted at the point where a slot changes. Further, in a case where data of the slot is "1", the state of the symbol is inverted at the center of the slot, and in a case where data of the slot is "0", the state of the symbol is maintained. By performing this modulation, DC component of the transmission line can be minimized and clock reproduction can be easily performed.

Next, the preamble will be described with reference to the drawings. FIG. 4 is a diagram illustrating a preamble in IEC60958. There exist 3 kinds of preambles, that is, preambles X and Y representing channel 1 and channel 2 respectively and preamble Z representing a head of a block composed of 192 frames. As shown in FIG. 4, a particular pattern which is not represented in bi-phase modulated symbols is used for the preamble.

Figure 5:
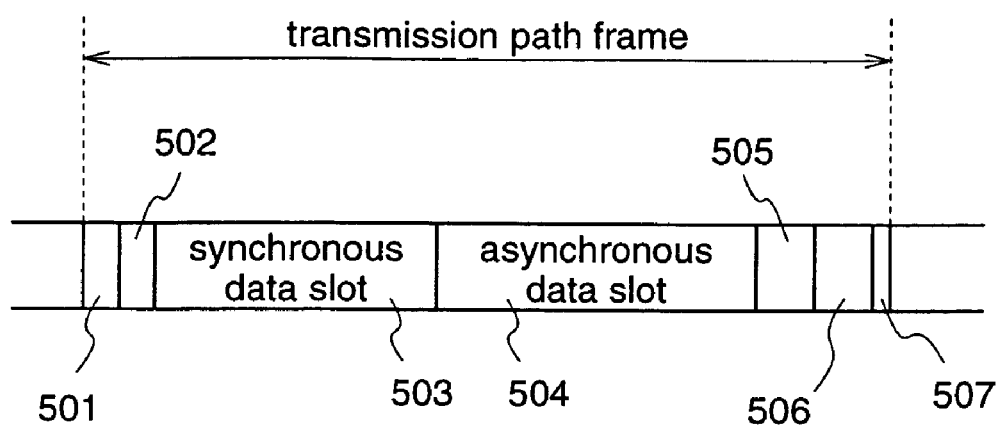
FIG. 5 is a diagram illustrating a transmission path format in MOST.

A data format in the transmission path 100 in this first embodiment is shown in FIG. 5. In this first embodiment, a format in Media Oriented Systems Transport (hereinafter referred to as "MOST") disclosed in Patrick Heck, Hervert Hetzel, Dave Knapp, Kevin Rolfes, Venkat Srinivas, Andreas Stiegler, Tony Susanto, and David Trager. Media Oriented Synchronous Transfer—A Network Protocol for High Quality, Low Cost Transfer of Synchronous, Asynchronous, and Control Data on Fiber Optic. Presented at the 103rd AES Convention, 1997 Sep. 26-29, New York, is used in the transmission path 100. That is, in FIG. 5, reference numeral 501 denotes a preamble in the transmission path format, numeral 502 denotes a boundary descriptor, numeral 503 denotes a synchronous data slot, numeral 504 denotes an asynchronous data slot, numeral 505 denotes a control frame, numeral 506 denotes a data for frame control and numeral 507 denotes a parity. Then, the boundary descriptor 502 indicates a location of a boundary between the synchronous data slot 503 and the asynchronous data slot 504, and the data for frame control 506 and the parity 507 are used for frame error detection and the like. In MOST, the transmission path formats are consecutively transmitted to the respective apparatuses connected to the transmission path 100. Then, the respective apparatuses perform data transmission using the synchronous data slot 503, the asynchronous data slot 504 or the control frame 505, which are periodically transmitted from the transmission path 100.

In this first embodiment, the transmission data are to be transmitted using the synchronous slot 503. Hereinafter, the transmission process will be described with reference to the drawings.

Figure 6:
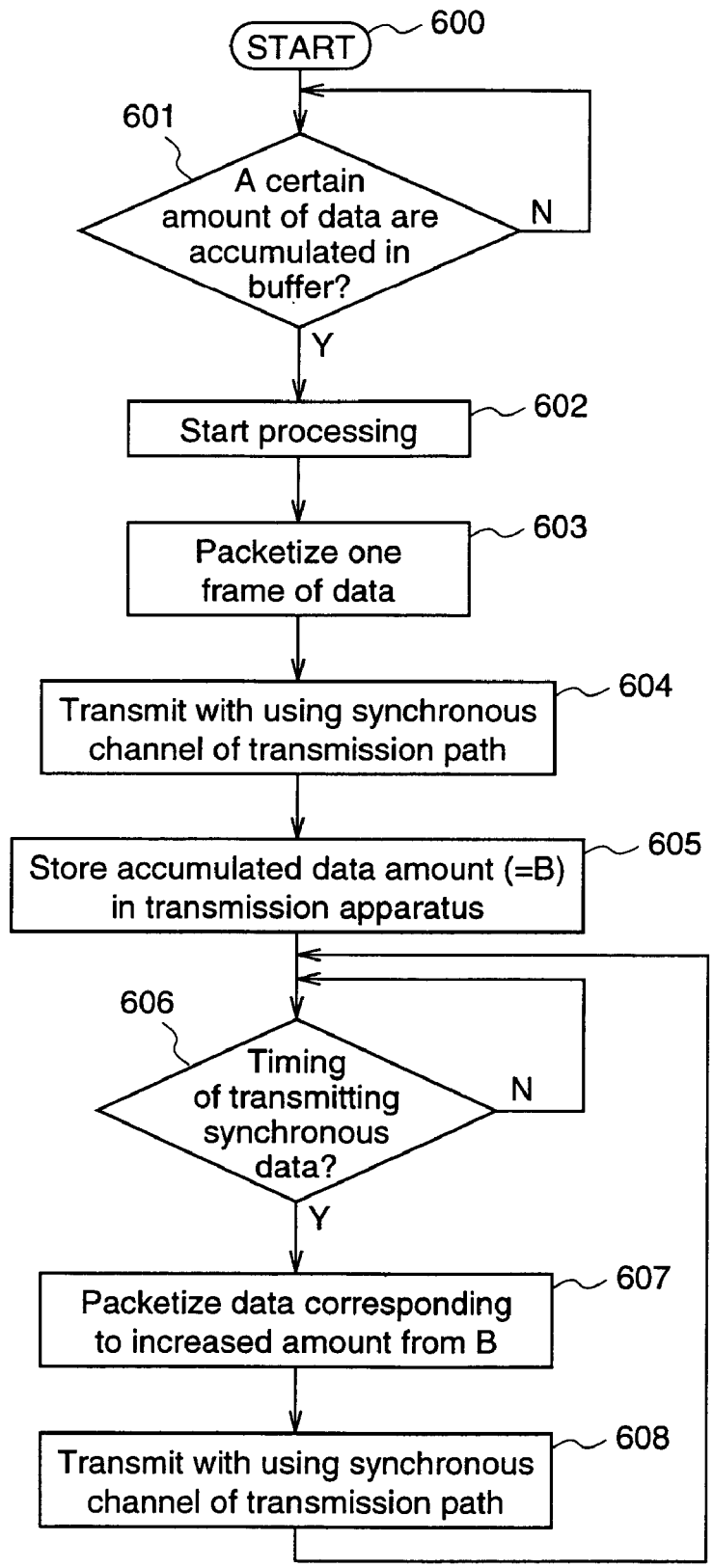
FIG. 6 is a diagram illustrating a process flow chart of a data transmission apparatus according to the embodiments of the present invention.

FIG. 6 is a diagram illustrating a process flow chart of the transmission apparatus in this first embodiment. When the flow starts (step 600), transmission data are input from the data generation means 111 to the transmission-side buffer means 114 in the IEC60958 format. The transmission-side buffer control means 115 monitors the accumulated data amount in the transmission-side buffer means 114, and, when a certain value, for example, 2 frames of data are accumulated, starts data output from the transmission-side buffer means 114 to the data packet generation means 113 (step 601).

A read start instruction is outputted to the data packet generation means 113 and the data packet generation means 113 transmits a read signal to the transmission-side buffer means 114, thereby performing the start of data output (step 602).

Figure 7:
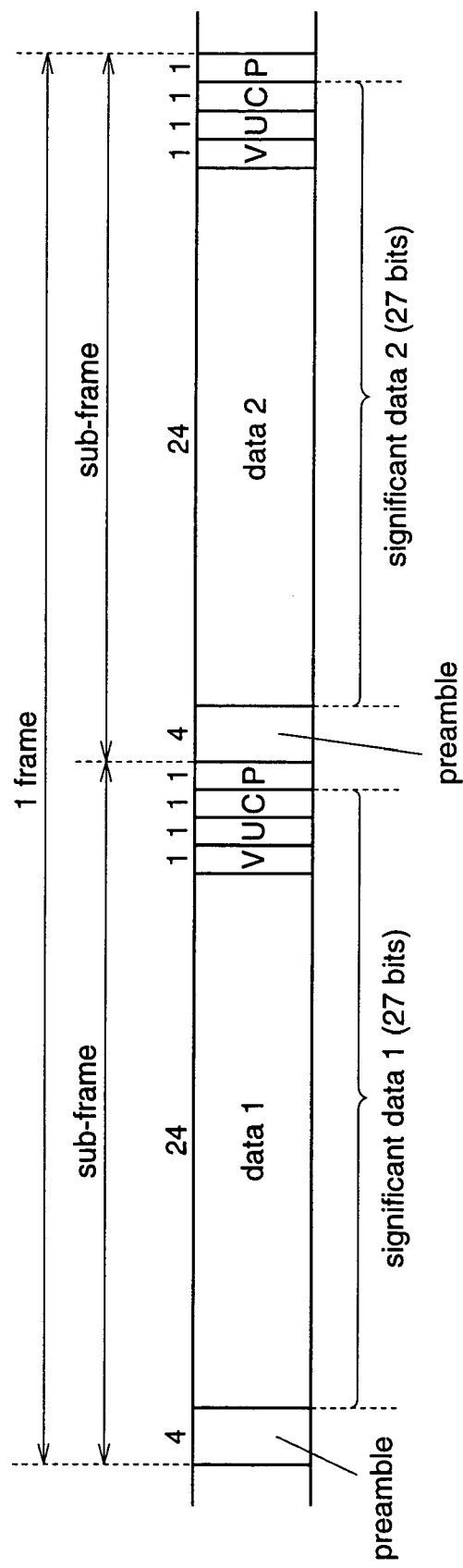
FIG. 7 is a diagram illustrating a packetized format of transmission data used in the data transmission system according to a first embodiment of the present invention.
Figure 7:
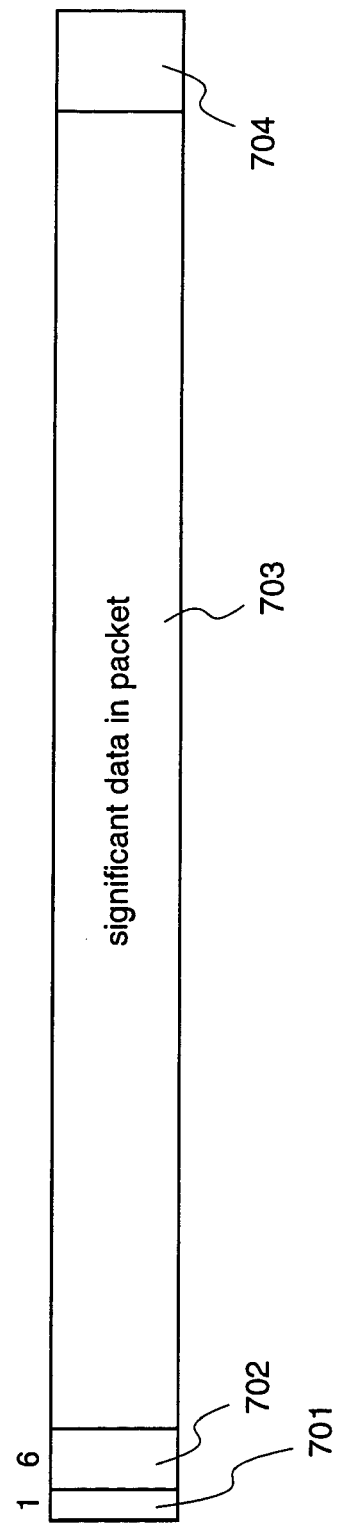

After receiving the first 1 frame of data, the data packet generation means 113 performs packetization of the transmission data (step 603). FIG. 7 is a diagram illustrating a packetized format of the transmission data. Here, FIG. 7(*a*) shows 1 frame of data before packetized and FIG. 7(*b*) shows packetized data, in which reference numeral 701 denotes an indicator, numeral 702 denotes a data length, numeral 703 denotes significant data in the packet, and numeral 704 denotes spare bits. Further, in figures, numerals described above the format indicate the number of bits allocated to the respective fields. In this first embodiment, the frame shown in FIG. 7(*a*) is packetized by omitting bits of preamble and parity as shown in FIG. 7(*b*) and transmitted to the transmission path. These preamble and parity bits are required at the data processing and are not used during the transmission between the transmission apparatus 110 and the reception apparatus 120 via the transmission path 100.

In FIG. 7(*b*), the indicator 701 is a flag indicating whether the significant data in the packet 703 subsequent thereto start from a head of a block or not, and "1" indicates a case where the data 703 start from the head of the block (preamble "Z") and "0" indicates the other cases. Further, the data length 702 indicates the number of bits of the significant data included in the packet. The remaining part is spare bit 704.

The data packet created in the process described above is synchronized with a clock of the transmission path supplied from the first communication control means 112 (hereinafter referred to as "transmission path clock") and is transmitted to the transmission path with the output timing of the synchronous channel of the transmission path (step 604).

Then, the data packet generation means 113 stores the accumulated data amount in the transmission-side buffer means 114 at this time (step 605). Then, with the timing of outputting the next synchronous data (step 606), data corresponding to the increased amount from the accumulated data amount are packetized (step 607) and transmitted to the transmission path (step 608).

Then, the number of bits of the spare bit 704 variably changes according to the number of bits of the significant data 703 to be packetized.

By repeating the operations as described above, the packets are continuously transmitted.

Figure 8:
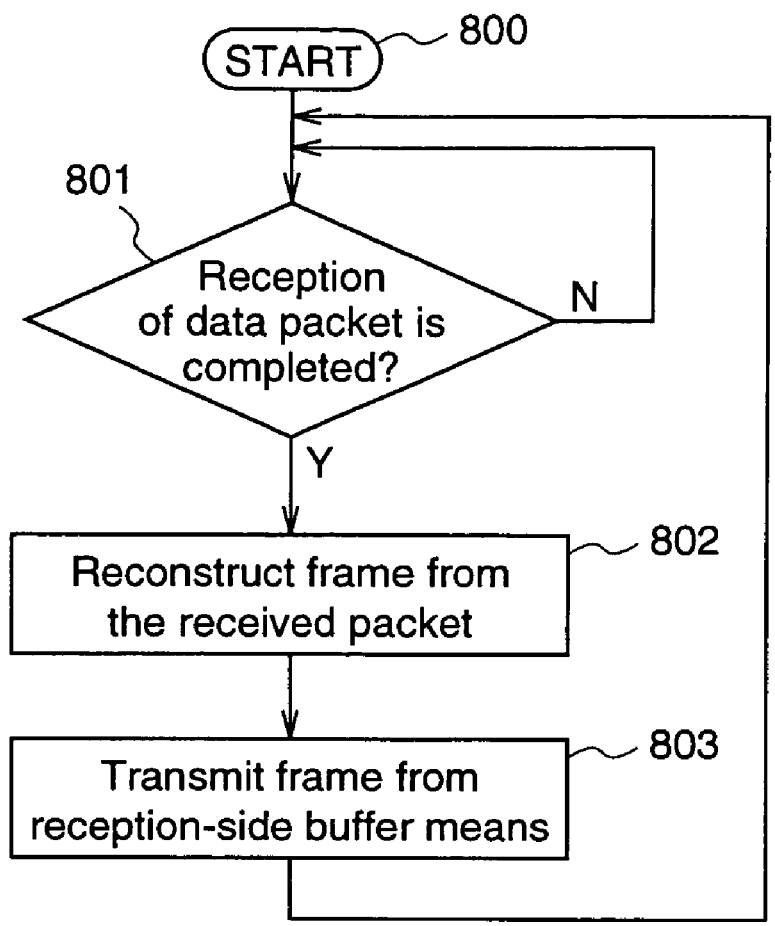
FIG. 8 is a diagram illustrating a process flow chart of a data reception apparatus according to the embodiments of the present invention.

FIG. 8 is a diagram illustrating a process flow chart of the reception apparatus in this first embodiment. When the flow starts (step 800), in the reception apparatus 120, the second communication control means 122 receives the data packet and transmits the data packet to the data extraction means 123 in synchronization with the transmission path clock (step 801).

The data extraction means 123 reconstructs the transmission data from the packet (adds preamble and parity) (step 802), and transmits the reconstructed data to the reception-side buffer means 124 (step 803). For example, when receiving a packet in which the indicator represents "1", the data extraction means adds a preamble of "Z" and starts the output, and thereafter "Y", "X", "Y", . . . are sequentially added as preambles.

The reception-side buffer means 124 temporarily accumulates the transmission data, and starts to output the data to the data processing means 121 at the moment when a certain value, for example, 2 frames of data are accumulated. The controls for starting the output of the transmission data, reading and the like are performed by the reception-side buffer control means 125.

In the reception apparatus 120 in this first embodiment, the clock control means 126 performs processing for controlling an output clock rate to the data processing means 121 in accordance with the accumulated data amount in the reception-side buffer means 124. The clock control means 126 has a clock generating source inside. The clock generating source generates an output clock of a value approximate to a transmission data clock which is a clock of the transmission data output from the data generation means 111, and further can slightly adjust the rate of the generated output clock since the transmission data clock is reproduced by the reception apparatus 120.

Figure 9:
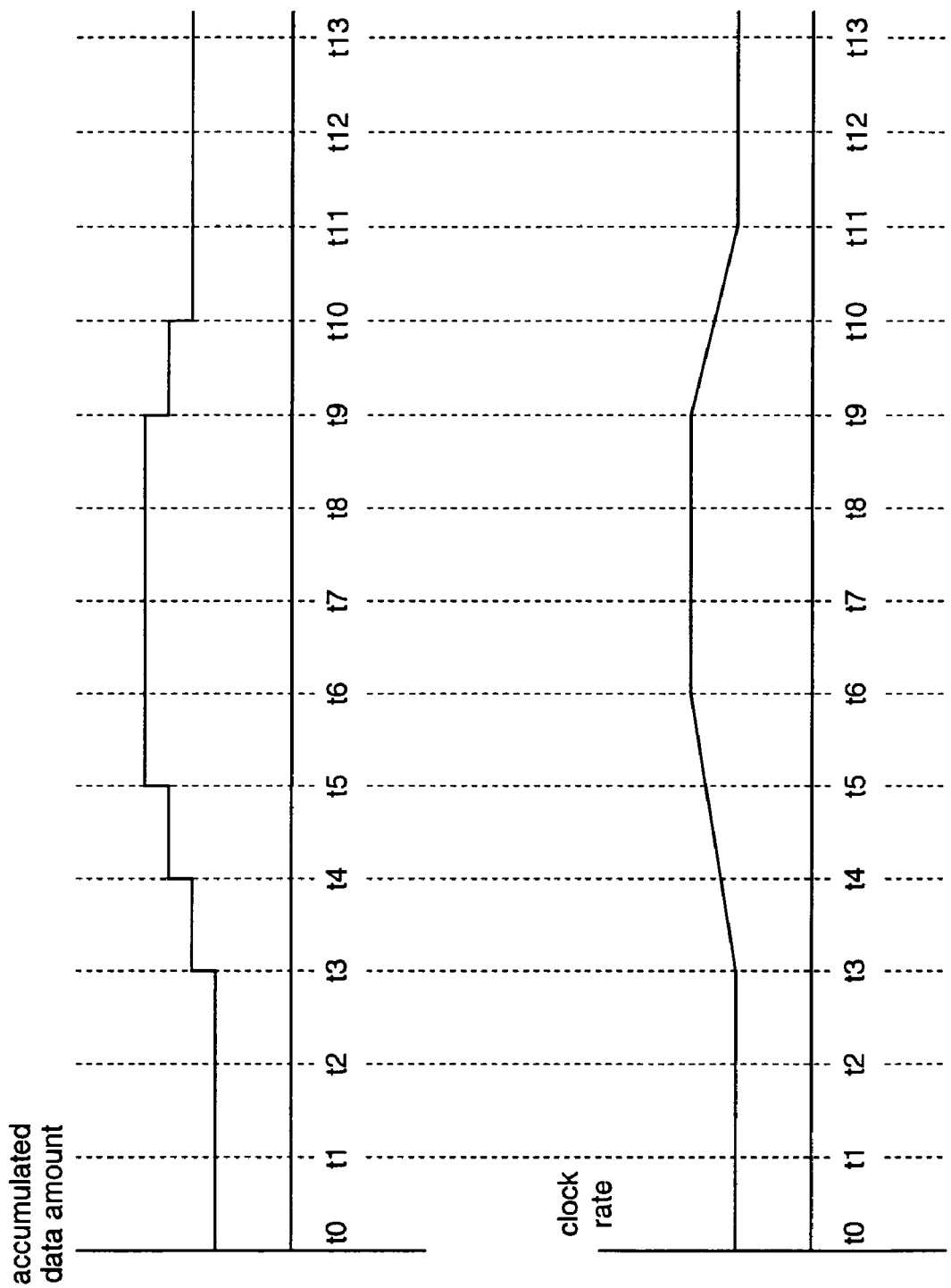
FIG. 9 is a diagram illustrating a clock control method according to the embodiments of the present invention.

Hereinafter, the control of the output clock by the clock control means 126 will be described with reference to the drawings. FIG. 9 is a diagram illustrating the clock control method in this first embodiment. FIG. 9(*a*) shows the accumulated data amount in the reception-side buffer means 124 wherein the axis of ordinate represents the accumulated data amounts and the axis of abscissa represents the elapsed time. Further, FIG. 9(*b*) shows the rates of the clock generated by the clock control means 126 wherein the axis of ordinate represents clock rates and the axis of abscissa represents the elapsed time.

The accumulated data amount in the reception-side buffer means 124 starts to increase at time t3 (FIG. 9(*a*)). When the clock control means 126 detects this increase, it increases the rate of the output clock to be supplied to the buffer control means 125 (FIG. 9(*b*)). As a result of increasing the read rate, the increase in the accumulated data amount stops at time t6 and hence the clock control means 126 stops the processing for increasing the output clock rate.

Then, when the accumulated data amount starts to decrease at time t9, the clock control means 126 reduces the output clock rate. As described above, by controlling the output clock rate by the clock control means 126, the transmission data are supplied from the reception-side buffer means 124 to the data processing means 121 at almost the same rate as the rate at which the data generation means 111 transmits the transmission data.

Hereinafter, this first embodiment will be described in more details with using a specific example. Here, a system in which while the data generation means 111 and the clock control means 101 operate on a clock of the same rate in specifications, asynchronization is exactly caused due to the difference of the clock sources, will be considered, and as an example, a system in which 64 bits of data for 1 frame shown in FIG. 7 are allocated to the synchronous data slot 503 in FIG. 5 in specifications thus performing the transmission exactly, will be considered.

In a case where the clock sources are precisely identical to each other, the data packet generation means 113 performs packetization shown in FIG. 7(b), sets 54 bits as the number of bits allocated to the field for the significant data in the packet 703 and 3 bits as the number of bits allocated to the field for the spare bit 704 for a packet, and continues to transmit the packets to the transmission path 100, thereby performing proper transmission.

However, in a case where a rate at which the data generation means 111 transmits the transmission data is lower than a rate of the clock generated by the clock control means 101, when 3 bits are always set as the number of bits of the field for the spare bit 704 in a like manner and the transmission is performed, the data to be transmitted to the transmission path 100 become short (underflow). In such a case, the transmission apparatus of this first embodiment performs processing to sometimes transmit the packet in which the field for the spare bit 704 is of 4 bits as well as the packet in which the field for the spare bit 704 is of 3 bits, thereby absorbing the clock error.

Then, in the reception apparatus 120, the transmission data is sequentially input to the reception-side buffer means 124 and transmitted to the data processing means 121 on the basis of the read signal of the reception-side buffer control means 125. In a case where the rate at which the data generation means 111 transmits the transmission data is lower than the rate of the clock generated by the clock control means 101, the clock output from the clock control means 126 becomes a slightly lower value than the transmission path clock on average, that is, becomes equal to the clock on which the data generation means 111 transmits the transmission data.

On the other hand, in a case where a rate at which the data generation means 111 transmits the transmission data is higher than a rate of the clock generated by the clock control means 101, when 3 bits are always set as the number of bits of the field for the spare bit 704 in a like manner and the transmission is performed, the data, which cannot be transmitted to the transmission path 100, is gradually accumulated in the transmission apparatus 110 (overflow). Also in such a case, the transmission apparatus of this first embodiment performs processing to sometimes transmit the packet in which the number of bits of the field for the spare bit 704 is 2 bits as well as the packet in which the number of bits of the field for the spare bit 704 is 3 bits, thereby absorbing the clock error.

Then, in the reception apparatus 120, the transmission data is sequentially input to the reception-side buffer means 124 and transmitted to the data processing means 121 on the basis of the read signal of the reception-side buffer control means 125. When the rate, at which the data generation means 111 transmits the transmission data, is higher than the rate of the clock generated by the clock control means 101, the clock output from the clock control means 126 becomes a slightly higher value than the transmission path clock on average, that is, becomes equal to the clock on which the data generation means 111 transmits the transmission data.

Thus, according to this first embodiment, a data packet obtained by omitting a preamble or a parity, or both of them, from the data generated by the data generation means 111 and adding the data length 702 and the spare bit 704 is transmitted as an access unit from the transmission apparatus 110 to the transmission path 100, and thereby data can be transmitted without shortage or excess by adjusting the length of the spare bit 704 (the number of bits) even when there is a difference between the clock rate of the transmission path 100, which is controlled by the clock control means 101, and the clock rate which is used for the processing inside the transmission apparatus 110. Further, the reception apparatus 120 reconstructs data by adding, to the received data, the preamble or parity, or both of them, which have been omitted, and the clock control means 126 adjusts the rate of data reading clock to the reception-side buffer 124 for transmitting data to the data processing means 121, and thereby the data output from the data generation means 111 on the side of the transmission apparatus 110 is processed at the same rate as the rate at which the data has been output, by the data processing means 121 on the side of the reception apparatus 120, even when there is a difference between the clock rate of the transmission path 100 and the clock rate of the transmission apparatus 110 and reception apparatus 120.

Here, while in this first embodiment the indicator 701 represents "1" for the packet starting from a head of a block (a packet of preamble "Z"), the indicator 701 may represent "1" only when the transmission starts.

Embodiment 2

Next, a data transmission system and data transmission method according to a second embodiment of the present invention will be described. This second embodiment is characterized in that a format in packetization is different from that of the above-described first embodiment. Hereinafter, a description will be made with reference to the drawings.

Figure 10:
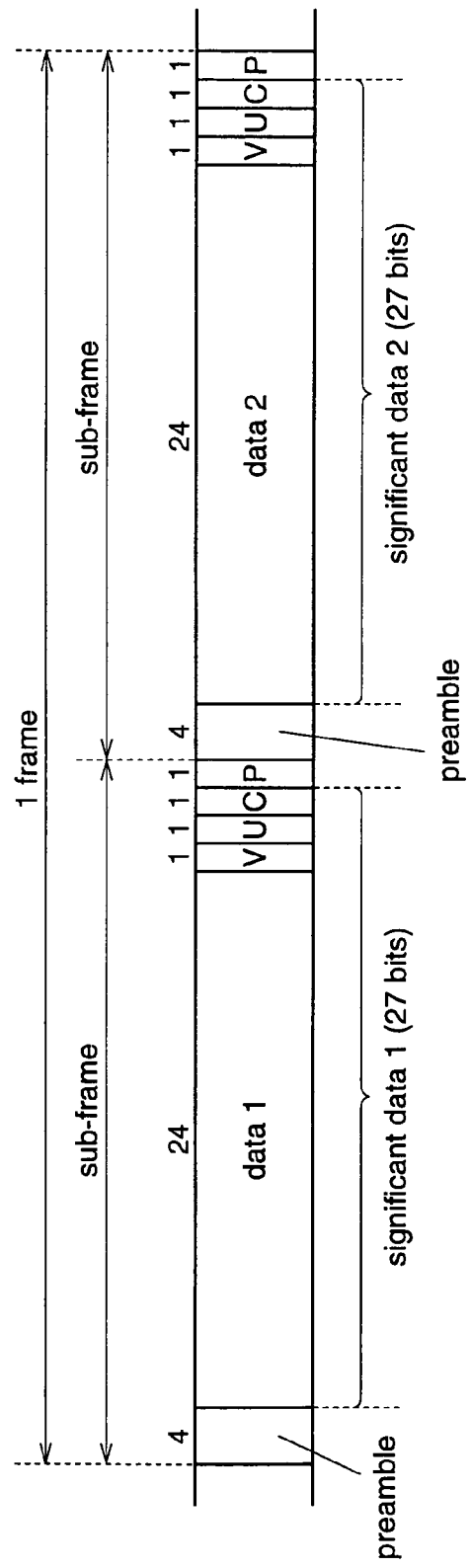
FIG. 10 is a diagram illustrating a packet construction used in a data transmission system according to a second embodiment of the present invention.
Figure 10:
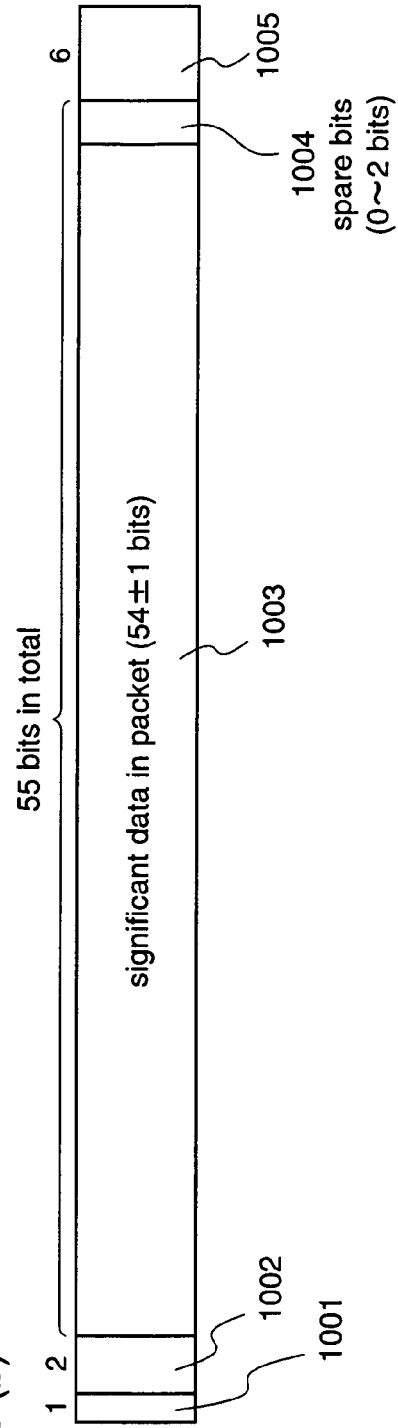

FIG. 10 is a diagram illustrating a construction of a packet used in the data transmission system in this second embodiment. In FIG. 10, a frame construction of transmission data shown in FIG. 10(a) is the same as that shown in the first embodiment. Further, in FIG. 10(b), reference numeral 1001 denotes an indicator, numeral 1002 denotes a data length, numeral 1003 denotes significant data in the packet, numeral 1004 denotes spare bit, and numeral 1005 denotes arbitrary data.

In this second embodiment, not the number of bits of the significant data in the packet 1003, but the number of bits of the spare bit 1004 is described in the field for the data length 1002. For example, in a system where while the data generation means 111 and the clock control means 101 operate on a clock of the same rate in specifications, asynchronization is exactly caused due to the clock sources being different, a difference in the number of bits among the respective transmission frames is slight. That is, the variation in the number of bits of the spare bit 1004 ranges between 1 bit and 2 bits and therefore 2 bits are sufficient for the field for the data length 1002.

As a result, in this second embodiment, 6 bits of spare portion is generated for 1 frame, and arbitrary data can be written by an application in this spare area, that is, the area of the arbitrary data 1005.

Then, a configuration as an apparatus in this second embodiment is identical to that shown in FIG. 1 and the detailed description is omitted here.

The packet construction of this second embodiment described above is effective particularly when synchronizing the clocks in a system where the clock of the data generation means 111 is different in rate from the transmission path clock in specification, for example, in a configuration in which the data generation means 111 which generates data has a clock source of 48 kHz while the clock control means 101 has a clock source of 44.1 kHz. That is, it is necessary that in such a system, 48/44.1 times the data amount should be transmitted in a packet as compared to a case where the data generation means 111, which generates data, has a clock source of 44.1 kHz. Therefore, in such a case, 4 bits among the portion of the arbitrary data 1005 shown in FIG. 10 (6 bits) are used for data transmission and the variation in the number of bits of the significant data in the packet 1003 is absorbed into the field for the spare bit 1004 and thereby the transmission system can perform data transmission without failure.

Thus, according to this second embodiment, with noting that a variation in the number of bits of the spare bit 1004 is slight, the number of bits of spare bit 1004 is described in the field for the data length 1002, and the number of bits thereof is 2 bits, and further the variation in the number of bits of the significant data in the packet 1003 is absorbed using the field for the spare bit 1004 of 2 bits. Therefore, an area for the arbitrary data 1005 into which an application software can write arbitrary data can be secured in the packet.

Embodiment 3

Next, a data transmission system and data transmission method according to a third embodiment of the present invention will be described. This third embodiment is characterized in that a format in the packetization is different from that of the above-described first embodiment. Hereinafter, description will be made with reference to the drawings.

FIG. 11 is a diagram illustrating a construction of a packet used in the data transmission system in this third embodiment. In FIG. 11, a frame construction of transmission data shown in FIG. 11(*a*) is the same as that shown in the first embodiment. Further, in FIG. 11(*b*), reference numeral 1101 denotes a spare bit length, numeral 1102 denotes a preamble type, numeral 1103 denotes a preamble location pointer, numeral 1104 denotes significant data in the packet, and numeral 1105 denotes spare bit.

This third embodiment is effective especially when the information for the frame reconstruction is periodically notified to the reception apparatus 120 so as to achieve the synchronization of the system in such a system that while the data generation means 111 and the clock control means 101 in FIG. 1 operate on the clock of the same rate in specifications, asynchronization is exactly caused due to the difference of the clock sources.

Here, while the frame information is periodically transmitted also by the above-described first embodiment, the indicator 701 represents only that the significant data in the packet 703 subsequent thereto start from a head of a block or the other case (refer to FIG. 7(*b*)), in the first embodiment. Therefore, for example, in a case where a stream gets discontinued halfway, frames cannot be reconstructed until a packet including an indicator 701 indicating that significant data start from a head of a block is received next. Then, in this third embodiment, a preamble type of the significant data in the packet or the like is added to each packet to facilitate the frame reconstruction.

Then, a configuration as an apparatus of this third embodiment is identical to that shown in FIG. 1, and the detailed description is omitted here.

The significant data 1104 and spare bit 1105 for 1 packet in this third embodiment are of 55 bits in total. The number of bits allocated to the field for the spare bit 1105 is indicated by the spare bit length 1101 of 2 bits.

Here, in a case where there is no asynchronization in clock between the data generation means 111 and the clock control means 101, the timing for 1 frame always coincides with that for 1 packet, and the significant data 1104 is always of 54 bits and the spare bit 1105 is always of 1 bit. On the other hand, in a case where there is asynchronization in clock between the data generation means 111 and the clock control means 101, a value, which is indicated in the spare bit length 1101, is set to 0 or 2, thereby performing adjustment. This adjustment is performed in a manner similar to that shown in the above-described second embodiment.

The preamble location pointer 1103 is of 5 bits, indicating where a break of the sub-frame is located in the significant data in the packet 1104. Since the significant data of a sub-frame is always of 27 bits (FIG. 11(*a*)), the break of the sub-frame is present anywhere within the first 27 bits in the significant data in the packet 1104. The preamble location pointer 1103 indicates the number of bits of up to the first break of the sub-frame.

The preamble type 1102 is of 2 bits in which the preamble type of the sub-frame starting from the break indicated by the above-described preamble location pointer 1103 is described.

As shown in FIG. 2, 3 types of preambles, Z, X and Y, are present, and the preambles are "Z" "Y" "X" "Y" . . . from the head of 1 block. That is, in cases where the preamble is Z and the preamble is X, the preamble of the subsequent sub-frame is Y while in a case where the preamble is Y, there are 2 case, i.e., a case where the preamble of the subsequent sub-frame is Z and a case where it is X. Then, in the case where the preamble is Y in the preamble type 1102, different symbols are allocated between in the case where the preamble of the subsequent sub-frame is Z and in the case where it is X.

For example, in a case where the first preamble in the packet is Z, "00" is allocated, in a case where the first preamble in the packet is X, "01" is allocated, in a case where the first preamble is Y and the preamble of the subsequent sub-frame is Z, "10" is allocated, and in a case where the first preamble is Y and the preamble of the subsequent sub-frame is X, "11" is allocated.

Then, the information in the preamble location pointer 1103 and the preamble type 1102 are reflected in the frame reconstruction by the reception apparatus 120.

As described above, according to this third embodiment, since the preamble location pointer 1103 is described in the field for the arbitrary data 1005 which is reserved in the second embodiment (FIG. 10(*b*)), when the reception apparatus reconstructs the frame, the reception apparatus 120 can receive the information on the location and type of the preamble from the transmission apparatus 110. For example, even when the stream gets discontinued, the reception apparatus can easily realize the frame reconstruction, thereby enhancing the reliability of the system.

Then, while in this third embodiment the spare bit length is provided as a field indicating the data length of the transmitted packet to indicate the number of bits of the spare bit 1105, for example, the number of bits of the significant data in the packet may be indicated as shown in the above-described first embodiment instead of the number of bits of spare bits, depending on the number of bits which can be transmitted for each packet.

Embodiment 4

Next, a data transmission system and data transmission method according to a fourth embodiment of the present invention will be described. This fourth embodiment is characterized in that a format in the packetization is different from that of the above-described first embodiment. Hereinafter, a description will be made with reference to the drawings.

FIG. 12 is a diagram illustrating a packet construction used in the data transmission system in this fourth embodiment. In FIG. 12, the frame construction of the transmission data shown in FIG. 12(*a*) is the same as that shown in the first embodiment. Further, in FIG. 12(*b*), reference numeral 1201 denotes a frame head indicator, numeral 1202 denotes a preamble type, numeral 1203 denotes a spare bit indicator, numeral 1204 denotes significant data in the packet, and numeral 1205 denotes spare bit.

The configuration of this fourth embodiment is effective especially when the information for frame reconstruction is periodically notified to the reception apparatus 120 so as to achieve synchronization of the system in a system where the clock of the data generation means 111 is different in rate from the transmission path clock in specifications, for example, in such a configuration that the data generation means 111 which generates data has a clock source of 48 kHz while the clock control means 101 has a clock source of 44.1 kHz.

Then, a configuration as an apparatus of this fourth embodiment is identical to that shown in FIG. 1, and the detailed description is omitted here.

The significant data 1204 and the spare bit 1205 for one packet in this fourth embodiment are of 60 bits in total. The length of the spare bit 1205 is 0 bit or 6 bits, which is discriminated by the spare bit indicator 1203.

In this fourth embodiment, in the packet construction in the transmission apparatus 110, in a case where the field for the significant data in the packet 1204 starts at a break of a sub-frame, the frame head indicator 1201 is set to "1". Further, at this time, the type of the sub-frame starting from the frame head is described using the preamble type (2 bits) 1202. On the other hand, in a case where the break of the sub-frame is located at a location other than the head of the packet, the frame head indicator 1201 is set to "0".

The reception apparatus 120 reflects the frame head indicator 1201 and the preamble type 1202 in the frame reconstruction.

As described above, according to this fourth embodiment, the construction is such that the spare bit 1205 is provided in the packet to absorb the variation in the number of bits and the frame head indicator 1201 indicating the head of the frame is provided in the packet. Therefore, when the reception apparatus 120 reconstructs the frame, it can periodically receive the information on the location and type of the preamble, and the reception apparatus 120 can easily realize frame reconstruction, for example, even when the stream gets discontinued, thereby enhancing the reliability of the system.

Then, while in this fourth embodiment the spare bit indicator 1203 is provided as a field indicating the data length of the transmitted packet to indicate the number of bits of the spare bit 1205, for example, the number of bits of the significant data in the packet may be indicated as shown in the above-described first embodiment instead of the number of bits of spare bit, depending on the number of bits which can be transmitted for each packet.

Embodiment 5

Next, a data transmission system and data transmission method according to a fifth embodiment of the present invention will be described. This fifth embodiment is different from the above-described second embodiment in that the area of the arbitrary data 1005 shown in the second embodiment (FIG. 10(*b*)) is used for time-information transmission for synchronizing the transmission and reception. Hereinafter, a description will be made with reference to the drawings.

Figure 13:
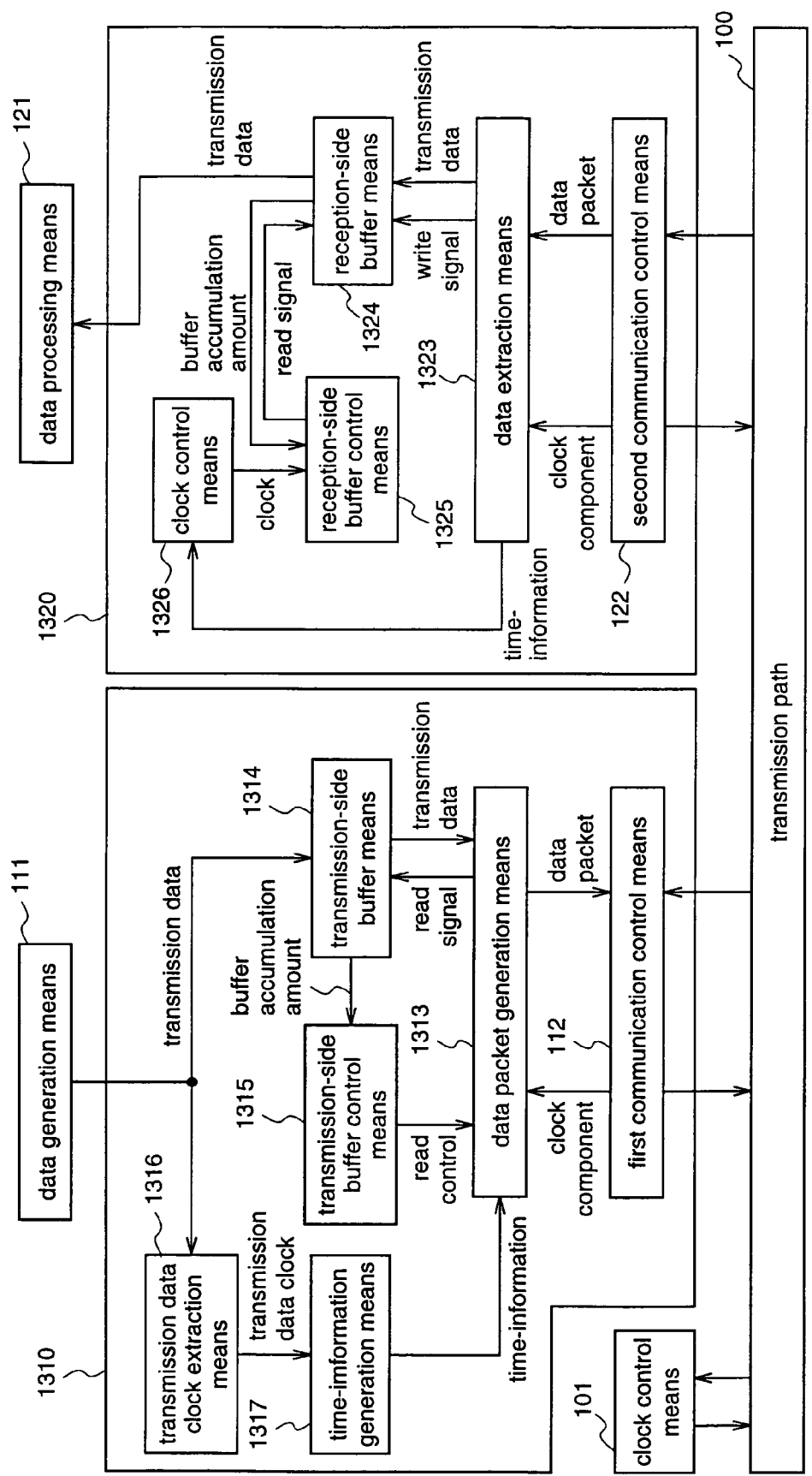
FIG. 13 is a block diagram illustrating a configuration of a data transmission system according to a fifth embodiment of the present invention.
Figure 14:
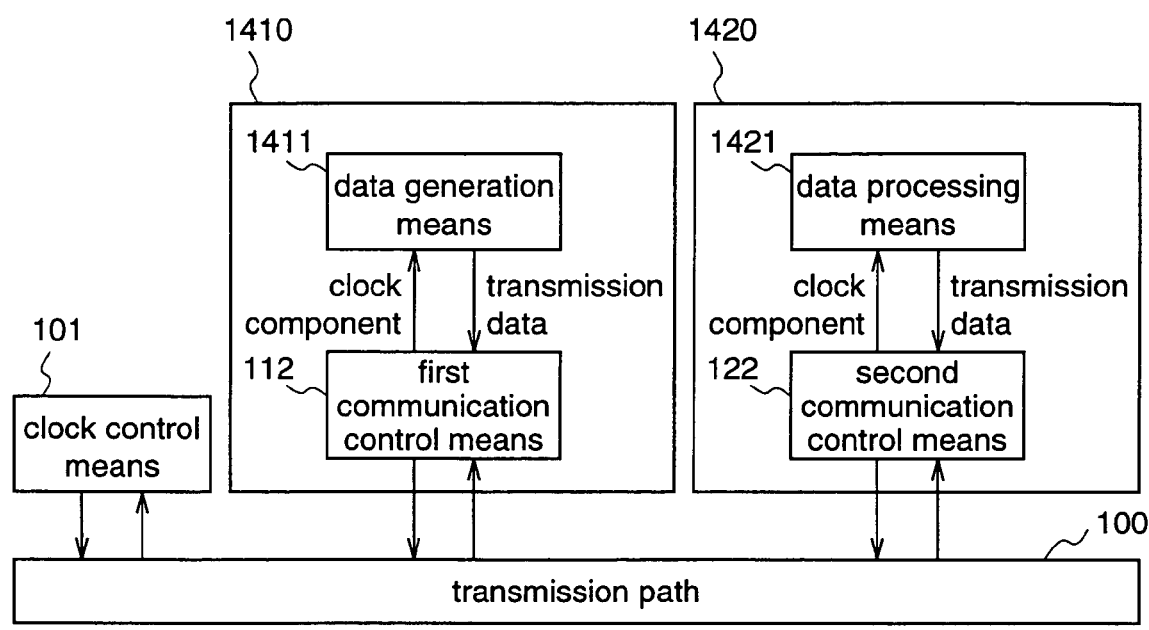
FIG. 14 is a block diagram illustrating a configuration of a conventional data transmission system.

FIG. 13 is a diagram illustrating a configuration of the data transmission system in this fifth embodiment, and in FIG. 13, the same reference numerals as those of FIG. 1 denote the same or corresponding parts, and reference numeral 1310 denotes a transmission apparatus, numeral 1313 denotes a data packet generation means, numeral 1314 denotes a transmission-side buffer means, numeral 1315 denotes a transmission-side buffer control means, numeral 1316 denotes a transmission data clock extraction means, and numeral 1317 denotes a time-information generation means.

Further, reference numeral 1320 denotes a reception apparatus, numeral 1323 denotes a data extraction means, numeral 1324 denotes a reception-side buffer means, numeral 1325 denotes a reception-side buffer control means and numeral 1326 denotes a clock control means.

Hereinafter, the description will be made with emphasis on the characteristic operation of the present invention. In the transmission apparatus 1310 of this fifth embodiment, the transmission data input from the data generation means 111 is also input to the transmission data clock extraction means 1316, in which the extraction of the transmission data clock, which is the clock of the transmission data output from the data generation means 111, is performed. The transmission data clock extracted by the transmission data clock extraction means 1316 is transmitted to the time-information generation means 1317. This time-information generation means 1317 has a timer for generating time-information, and generates time-information by operating the timer with using the extracted transmission data clock.

The data packet generation means 1313 reads time-information from the time-information generation means 1317 in synchronization with the timing of transmitting a packet, and writes the time at the transmission timing in the field for the arbitrary data 1005 in FIG. 10.

On the other hand, in the reception apparatus 1320, the data extraction means 1323 receives the packet including the time-information, extracts the time-information from the packet, and transmits the time-information to the clock control means 1326.

The clock control means 1326 has a clock generating source inside. The clock generating source generates an output clock of a value approximate to the transmission data clock, and can slightly adjust the rate of the output clock generated since the transmission data clock is reproduced in the reception apparatus 1320. The clock control means 1326 sequentially compares the time-information created on the basis of the received transmission data clock and the time calculated from the output clock from the clock generating source, and adjusts the rate of the output clock so that the time-information and the time coincide with each other. This operation allows the clock of the transmission data extracted by the transmission apparatus 1310 and the output clock which is output by the clock control means 1326 in the reception apparatus 1320 to be synchronized with each other achieving synchronization of the system.

In this way, according to this fifth embodiment, the time-information generation means 1317 is provided in the transmission apparatus 1310, and the time-information at the data transmission timing is described in the field for the arbitrary data 1005. The data extraction means 1323 in the reception apparatus 1320 extracts the time-information, and the clock control means 1326 compares the extracted time-information and the time-information based on the output clock generated from the clock generating source inside the clock control means 1326. Further, the clock control means 1326 adjusts the clock on the side of the reception apparatus 1320 so that both of them coincide with each other, thereby achieving synchronization between the transmission apparatus 1310 and the reception apparatus 1320 in the system.

Then, while in this fifth embodiment the transmission data clock is extracted from the transmission data, for example, the present invention is applicable exactly in a like manner even in a system in which the transmission clock is input separately from the transmission data.

Further, while in this fifth embodiment the time-information is transmitted for every packet, the transmission for every packet is not necessarily required. For example, the time-information may be transmitted for every several packets and in packets in which no time-information is transmitted, the arbitrary data 1005 can be used for another purpose, for example, for the same purpose as the spare bits which are shown in the first embodiment.

Further, while in this fifth embodiment the spare bit length 1002 is provided as a field indicating the data length of the transmitted packet to indicate the number of bits of the spare bit 1004, the number of bits of the significant data in the packet may be, for example, indicated instead of the number of bits of spare bits, depending on the number of bits which can be transmitted for each packet as shown in the first embodiment.

Embodiment 6

Next, a data transmission system and data transmission method according to this sixth embodiment will be described. While in each of the above-described embodiments, cases where the clock source of the data generation means 111 is different from the clock source of the transmission path clock are described. Further, described in this sixth embodiment is be a case where while a clock of the transmission data generated by the data generation means 111 (hereinafter referred to as "transmission data clock") is different in rate from the transmission path clock in specifications, clock sources thereof are the same. Hereinafter, a description will be made with reference to the drawings.

Figure 15:
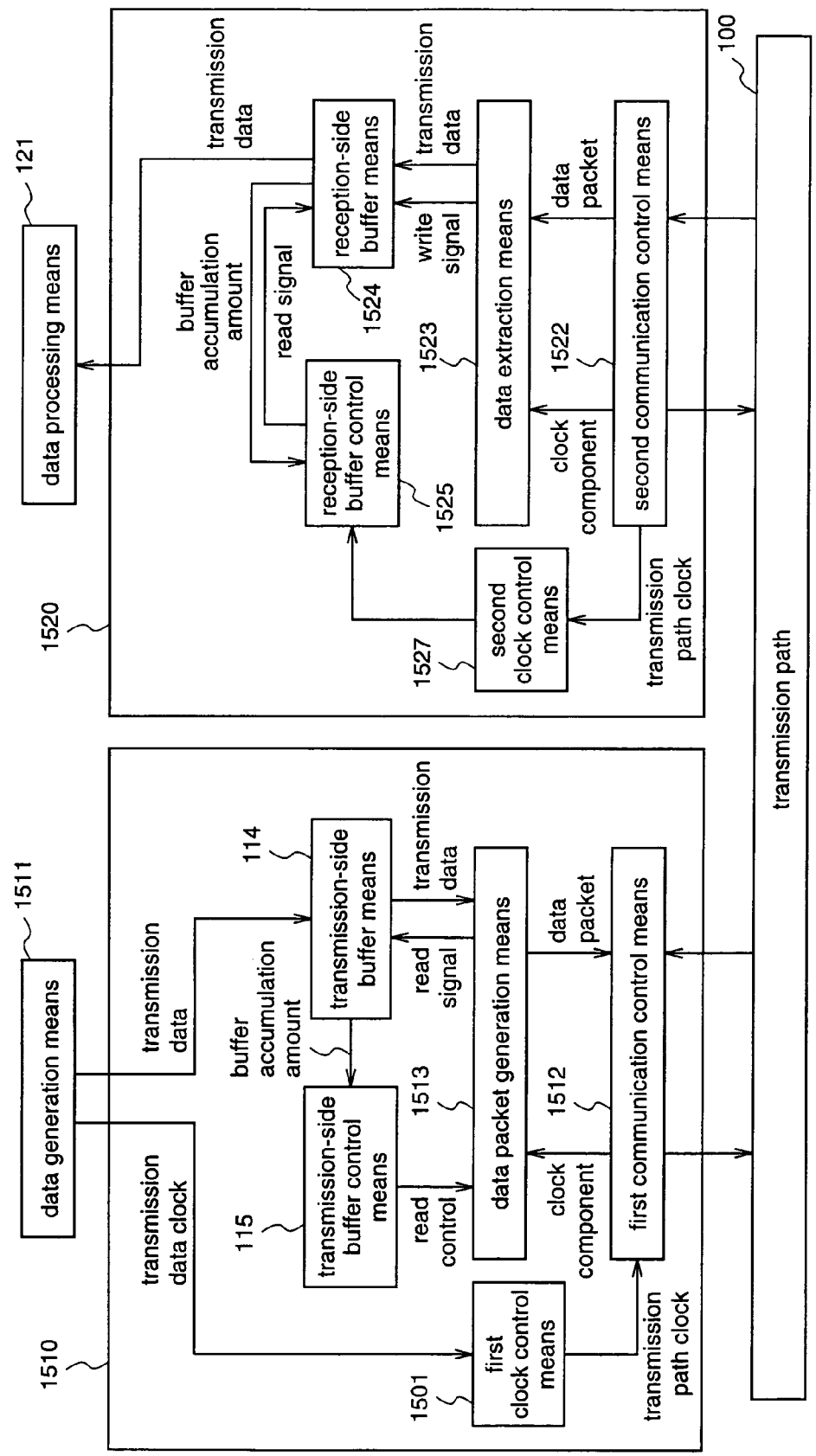
FIG. 15 is a block diagram illustrating a configuration of a data transmission system according to a sixth embodiment of the present invention.

FIG. 15 is a diagram illustrating a configuration of the data transmission system in this first embodiment. In FIG. 15, the same reference numerals as those in FIG. 1 denote the same or corresponding parts, and reference numeral 1501 denotes a clock control means, numeral 1510 denotes a transmission apparatus, numeral 1511 denotes a data generation means, and numeral 1512 denotes a first communication control means. Further, reference numeral 1520 denotes a reception apparatus, numeral 1522 denotes a second communication control means, numeral 1524 denotes a reception-side buffer means, numeral 1525 denotes a reception-side buffer control means, and numeral 1527 denotes a second clock control means.

Hereinafter, a description will be made with emphasis on the characteristic operation of the present invention. In the transmission apparatus 1510 of this sixth embodiment, the first clock control means 1501 generates the transmission path clock on the basis of the transmission data clock, and transmits the transmission path clock to the first communication control means 1512.

Then, the transmission path 100 operates in synchronization with the transmission path clock, which is input to the first communication control means 1512.

On the other hand, in the reception apparatus 1520, the second communication control means 1522 inputs the transmission path clock obtained from the transmission path 100 to the second clock control means 1527. The second clock control means 1527 generates the transmission data clock from the transmission path clock and supplies the transmission data clock to the reception-side buffer control means 1525. The reception-side buffer control means 1525 controls the data reading from the reception-side buffer means 1524 using the transmission data clock. In this way, in this sixth embodiment, the clock of the transmission apparatus 1510 is supplied from the data generation means 1511 to generate the transmission path clock, and the reception apparatus 1520 reproduces the transmission data clock on the side of the transmission apparatus using the reverse process, thereby supplying the same transmission data clock to the transmission apparatus 1510 and the reception apparatus 1520 and achieving synchronization between both apparatuses, that is, synchronization of the system.

Figure 16:
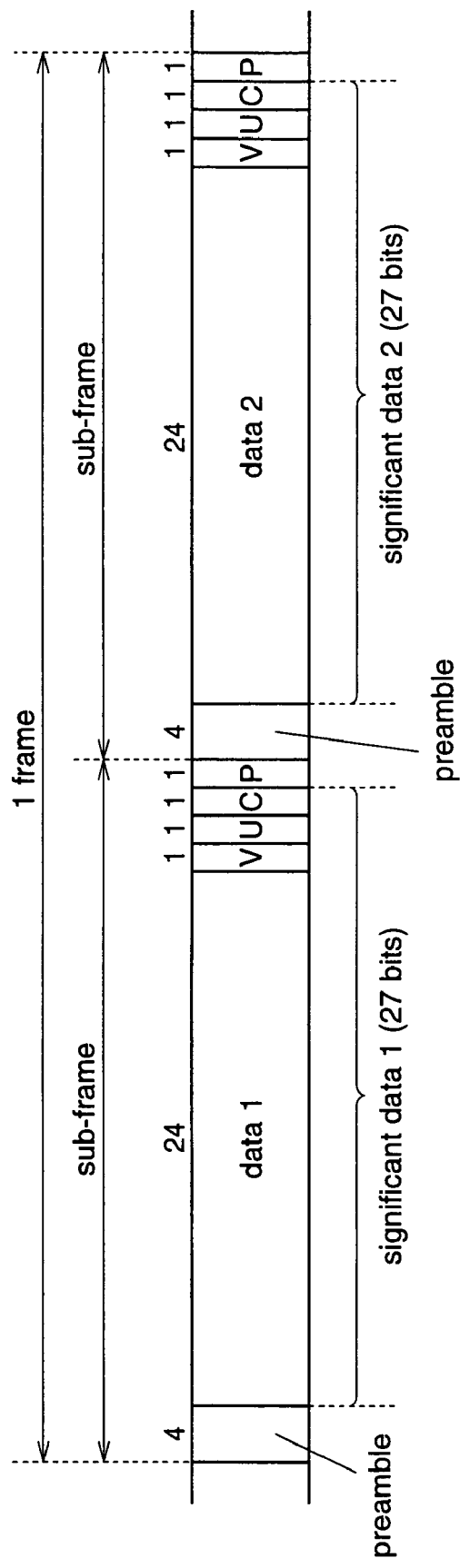
FIG. 16 is a diagram illustrating a packet construction used in the data transmission system according to the sixth embodiment of the present invention.
Figure 16:
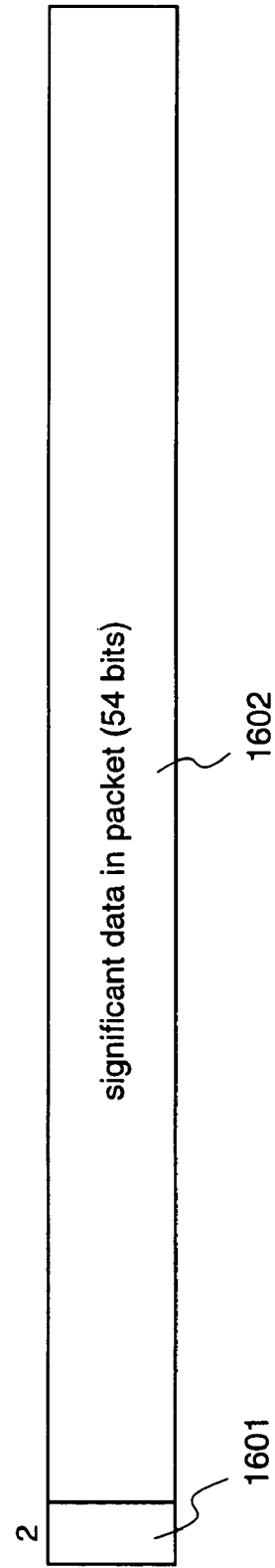

Hereinafter, the packetization of the transmission data frame in this sixth embodiment will be described using the drawings. FIG. 16 is a diagram illustrating a packet construction used in the data transmission system of this sixth embodiment. In FIG. 16, a frame construction of the transmission data shown in FIG. 16(*a*) is the same as that shown in the first embodiment. Further, in FIG. 16(*b*), reference numeral 1601 denotes a preamble type, and numeral 1602 denotes significant data in the packet. In this sixth embodiment, as in the above-described first embodiment, 54 bits of significant data are made into 1 packet, and 2 bits of preamble type are added thereto.

Next, a method of transmitting packetized transmission data frames in this sixth embodiment will be described using FIG. 17. Then, in this sixth embodiment, the transmission data clock is based on 48 kHz and 64 bits (that is, 1 frame) are transmitted in $\frac{1}{48000}$ second. Further, the transmission path clock is based on 44.1 kHz and a transmission path frame for transmitting 64 bits in $\frac{1}{44100}$ second is reserved.

The transmission system in this sixth embodiment generates a transmission path clock using a transmission data clock. A synchronization relationship is established between the transmission data clock and the transmission path clock, and the synchronization relationship, while 160 transmission data frames (transmitting 64 bits in $\frac{1}{48000}$ second) are input, 147 transmission path frames are transmitted, is established. Therefore, 160 transmission data frames are transmitted using 147 transmission path frames, thereby establishing proper synchronization relationship.

To be specific, in this sixth embodiment, bits for a preamble and a parity are omitted from the frame shown in FIG. 16(*a*) and the preamble type 1601 is added as shown in FIG. 16(*b*), thereby forming a transmission data frame of 64 bits into a packet of 56 bits. Thus, the data amount for 160 frames is 160×56=8960 bits. The number of frames required for transmitting these using transmission path frames is 8960/64=140 frames, and the transmission can be made in a state where 147−140=7 frames are spared.

Figure 17:
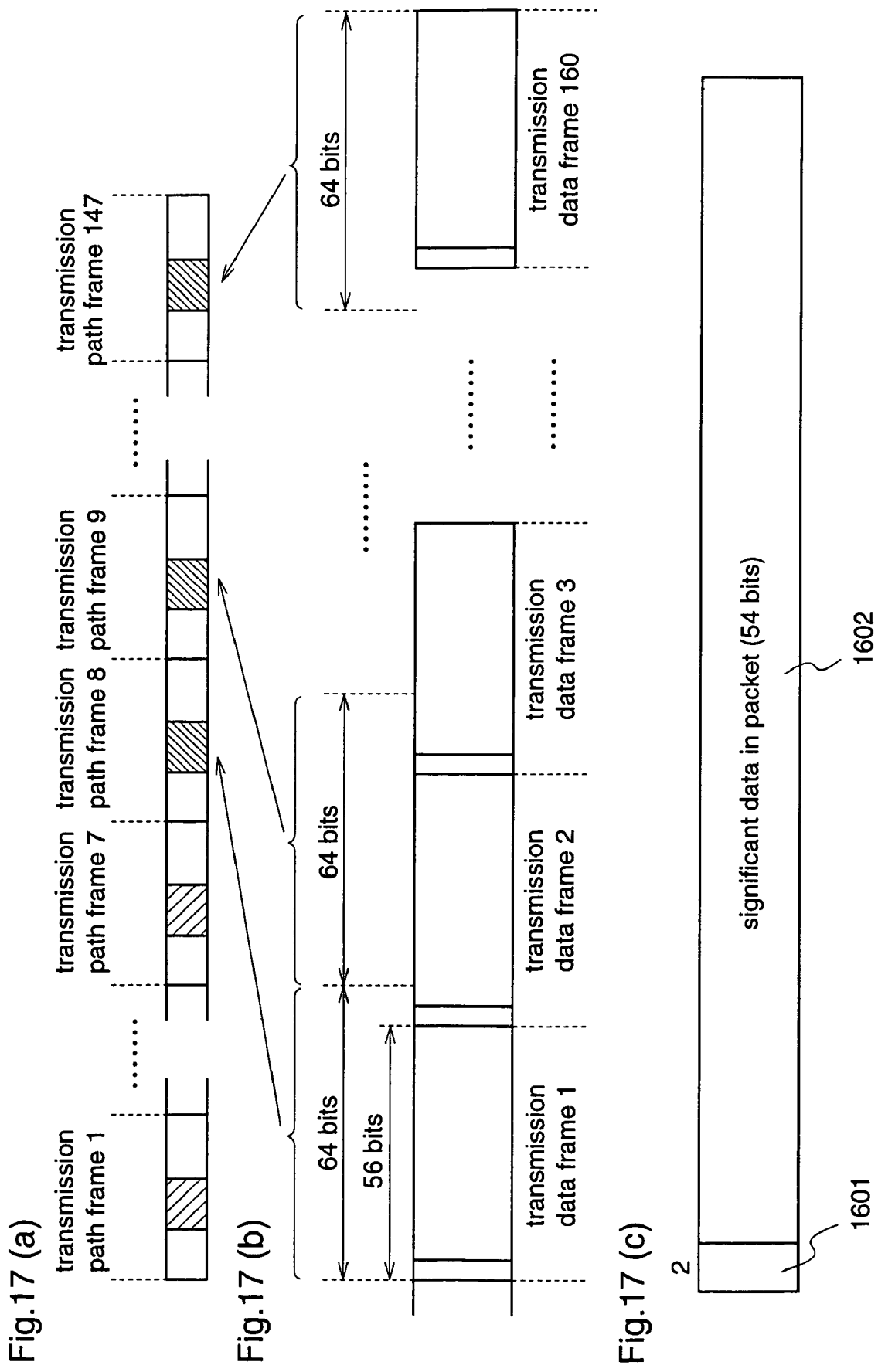
FIG. 17 is a diagram illustrating a method of transmitting transmission data frames in the data transmission system according to the sixth embodiment of the present invention.

The transmission data frames, each of which has been thus packetized as 56 bits (FIG. 17(*c*)), are sequentially combined (FIG. 17(b)) and are then transmitted 64 bits by 64 bits using the transmission path frame (FIG. 17(a)). In FIG. 17, the transmission data frames 1,2 . . . are transmitted in the transmission path frames 8,9 . . . respectively in this order, and the transmission of a total of 8960 bits of up to transmission path frame 147, that is, 160 transmission data frames is completed. By repeating these, the transmission data frames are continuously transmitted to the side of the reception apparatus 1520.

Then, in this sixth embodiment, data for packet synchronization between the transmission apparatus 1510 and the reception apparatus 1520 are accommodated in the transmission path frames 1 to 7 which have not been used for the transmission of transmission data frames. For example, in the transmission apparatus 1510, all the data of the transmission path frame 1 is set to "1", and the reception apparatus 1520 identifies as the transmission path frame 1 the transmission path frame in which all the data is set to "1" at the time of detecting the transmission path frame, and recognizes that a data packet starts from the transmission path frame 8 which is the eighth frame counting from the transmission path frame 1.

At this time, if the allocation to the preamble type 1601 is other than "11", for example, "00" is allocated for preamble Z, "01" for preamble X and "10" for preamble Y, each of the transmission path frames including packets, that is, the transmission path frames 8 to 147 surely include a bit of "0", thereby preventing the transmission path frames including packet synchronization data from being erroneously identified. Then, the arbitrary data, for example, the music data in the case of transmitting audio data, and the like, may be accommodated in the transmission path frames 2 to 7, which are other than the transmission path frame 1 used for the transmission of the synchronization data, among the transmission path data frames 1 to 7 which do not include the transmission data frames, and transmitted.

Figure 18:
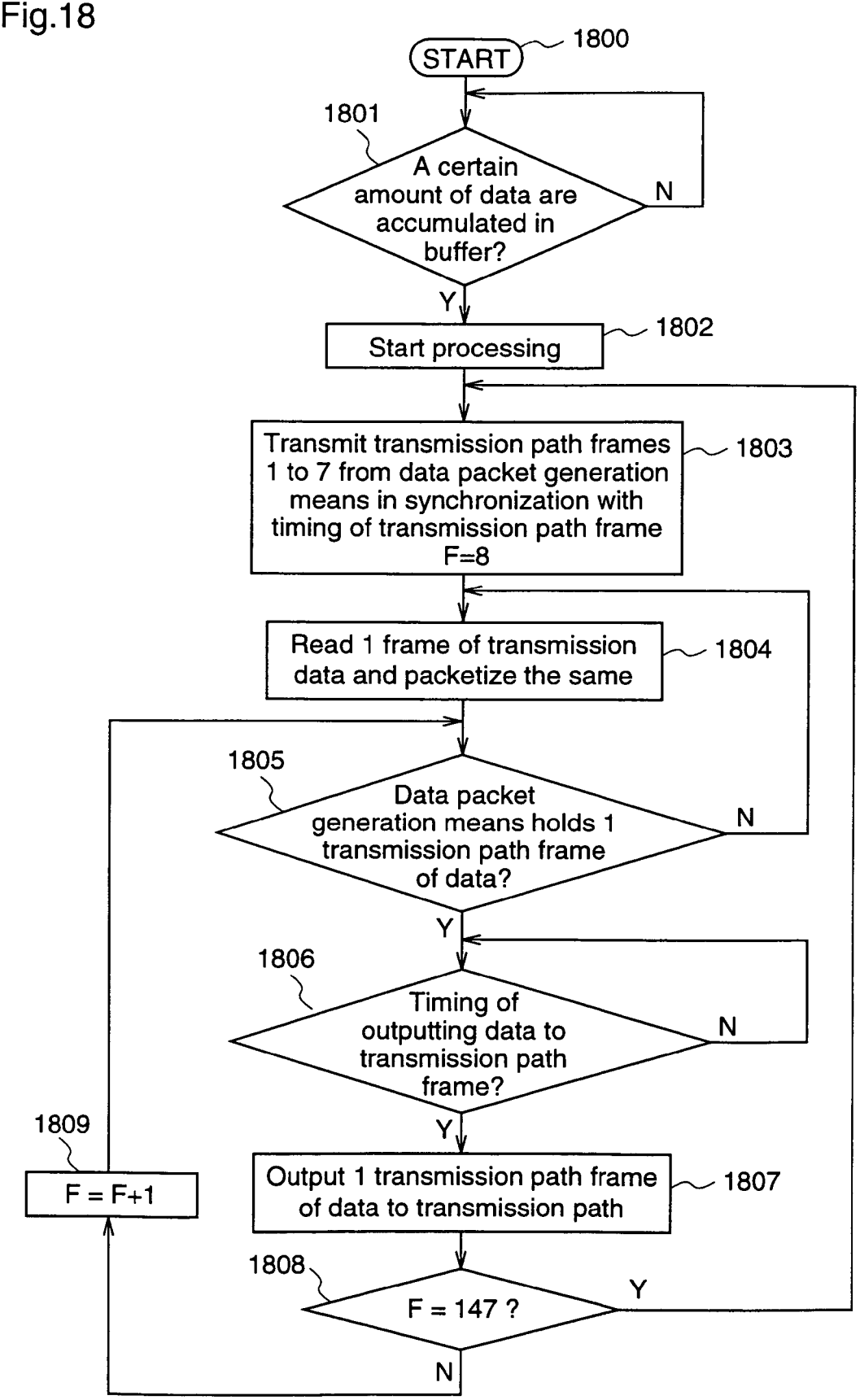
FIG. 18 is a diagram illustrating a process flow chart of the data transmission apparatus according to the sixth embodiment of the present invention.

Hereinafter, the transmission process will be described with reference to the drawings. FIG. 18 is a diagram illustrating a process flow chart of the transmission apparatus in this sixth embodiment. When the flow starts (step 1800), the transmission data is input from the data generation means 1511 to the transmission-side buffer means 114. The transmission-side buffer control means 115 monitors the accumulated data amount in the transmission-side buffer means 114 and, when a certain value, for example, 2 frames of data are accumulated (step 1801), starts a process of data output to the data packet generation means 1513 (step 1802). That is, the data packet generation means 1513 initially transmits the transmission path frames 1 to 7 in synchronization with the timing of the transmission path clock (step 1803). Then, the data packet generation means 1513 reads 1 frame of data from the transmission-side buffer means 114 and performs the packetization shown in FIG. 16 (step 1804). Then, when the data packet generation means 1513 does not hold data for 1 transmission path frame, that is, 64 bits of data in this sixth embodiment, which are to be transmitted subsequently (step 1805), the process is returned to step 1804, and 1 frame of transmission data are read from the transmission-side buffer means 114 and packetized.

Then, when the timing of outputting data to the transmission path frame comes (step 1806), data of 1 transmission path frame, that is, 64 bits of data in this six embodiment, are output to the transmission path (step 1807). Then, processes of step 1805 to step 1807 are repeated until the data packet generation means 1513 outputs the transmission path frame 147 in FIG. 17, and the output of the transmission path frame 147 is completed, (step 1808), and then the processes of step 1803 to step 1809 are repeated. Thereby, the packets are continuously transmitted.

Figure 19:
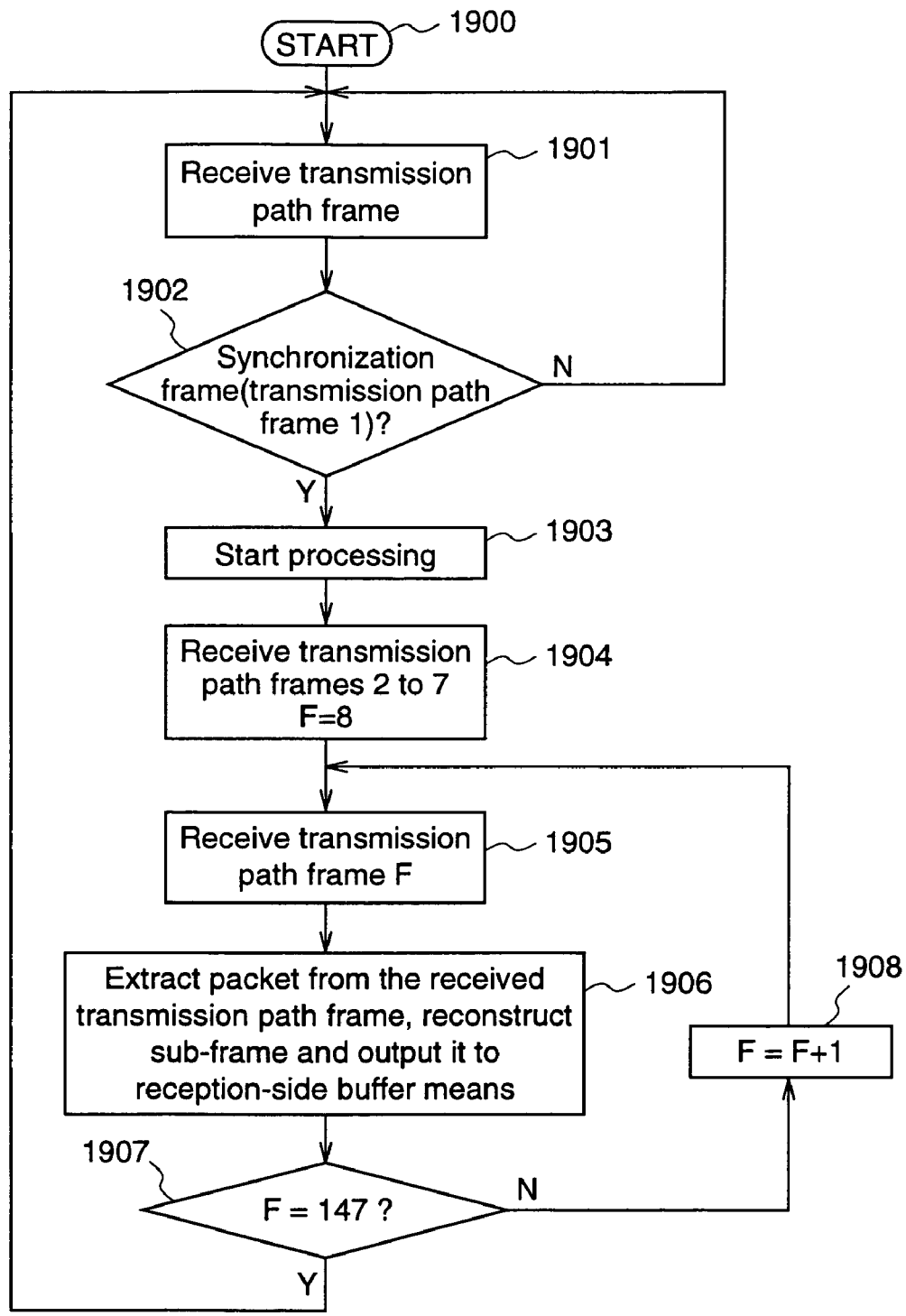
FIG. 19 is a diagram illustrating a process flow chart of the data reception apparatus according to the sixth embodiment of the present invention.

FIG. 19 is a diagram illustrating a process flow chart of the reception apparatus in this sixth embodiment. When the flow starts (step 1900), the reception apparatus 1520 receives the transmission path frames (step 1901) and, when the data of the transmission path frame indicates a frame including synchronization data indicating transmission path frame 1 (step 1902), starts the process (step 1903). Subsequently, the data extraction means 1523 receives transmission path frame 2 to transmission path frame 7 subsequent to the transmission path frame 1 (step 1904), and the data extraction means 1523 subsequently receives the transmission path frames (step 1905). Then, the data extraction means 1523 processes data for transmission data frame from the received transmission path frames, reconstructs the sub-frames, and outputs the sub-frames to the reception-side buffer means 1524 (step 1906). Then, processes of step 1905 to step 1906 are repeated until the transmission path frame 147 in FIG. 17 is received, and the process of transmission path frame 147 is completed (step 1907), and then processes of step 1901 to step 1908 are repeated.

Data accumulated in the reception-side buffer 1524 are read with the same clock as the transmission data clock in the transmission apparatus 1510 and transmitted to the data processing means 121.

In this way, according to this sixth embodiment, in a case where while the clock source of the data generation means 1511 and the clock source of the transmission path 100 are the same, the clock rate of the transmission data output from the data generation means 1511 is different from the clock rate of the transmission path 100. That is, in a system operating based on the transmission data clock of 48 kHz and the transmission path clock of 44.1 kHz, the transmission apparatus 1510 creates the transmission path clock from the transmission data clock in the first clock control means 1501, packetizes frames of the transmission data as 56 bits, and sequentially combines the packetized frames, and thereafter transmits the frames 64 bits by 64 bits with using the transmission path frame, and the reception apparatus 1520 receives the transmission path frame and the transmission path clock and creates the transmission data clock from the transmission path clock in the second clock control means 1527, and outputs the transmission data to the data processing means 121 on the basis of the transmission data clock, and therefore the synchronized transmission between the transmission apparatus 1510 and the reception apparatus 1520 can be realized.

Then, while in this sixth embodiment the transmission data clock is output from the data generation means 1511 to the transmission apparatus 1510 and the first clock control means 1501 generates the transmission path clock from the transmission data clock, any configuration may be adopted as long as the configuration is one in which the transmission data clock and the transmission path clock are generated from the same clock source. For example, the configuration may be one in which the first clock control means 1501 exists in another apparatus on the transmission path 100, and in this case, the data generation means 1511 receives the transmission path clock generated by the first clock control means 1501 in the other apparatus, and creates the transmission data clock from the received transmission path clock.

Further, while in this sixth embodiment each of 64 bits of the transmission path frame 1 accommodates "1", it is not necessarily restricted to this value. For example, a frame other than the transmission path frame 1 may be for synchronization data, or a plurality of frames may be used for synchronization data. Further, only one or more bits of the frame may be used as a mark for the transmission path frame including synchronization data, and the other bits may be used for another purpose, for example, for arbitrary data. Further, while in this sixth embodiment a system where the transmission data frame is transmitted on the basis of 48 kHz and the transmission path frame is transmitted on the basis of 44.1 kH is shown, they are not restricted to these numeric values, and any system is applicable by changing the number of transmission data frames and the number of the transmission path frames as long as the system is one in which the clock sources of the transmission data frame and the transmission path frame are common. For example, in a system where the transmission data frame is transmitted on the basis of 44.1 kHz and the transmission path frame is transmitted on the basis of 48 kHz the synchronization relationship that while 147 transmission data frames are input, 160 transmission path frames are transmitted, is established, and therefore in a case where packetization is performed on the basis of the method in this sixth embodiment and 56 bits of data are transmitted in 1 transmission path frame, when the transmission path for transmitting 56 bits in 1/48000 second is reserved, data can be transmitted using 147 transmission path frames and the remaining 13 transmission path frames can be used for the transmission of synchronization data and the transmission of arbitrary data.

Embodiment 7

Next, a data transmission system and data transmission method according to this seventh embodiment will be described. This seventh embodiment is characterized in that a format in packetization and a method of transmission to the transmission path are different from those for the above-described sixth embodiment. Hereinafter, a description will be made with reference to the drawings. Then, an apparatus configuration in this seventh embodiment is similar to that shown in FIG. 15, and the detailed description will be omitted here.

Figure 20:
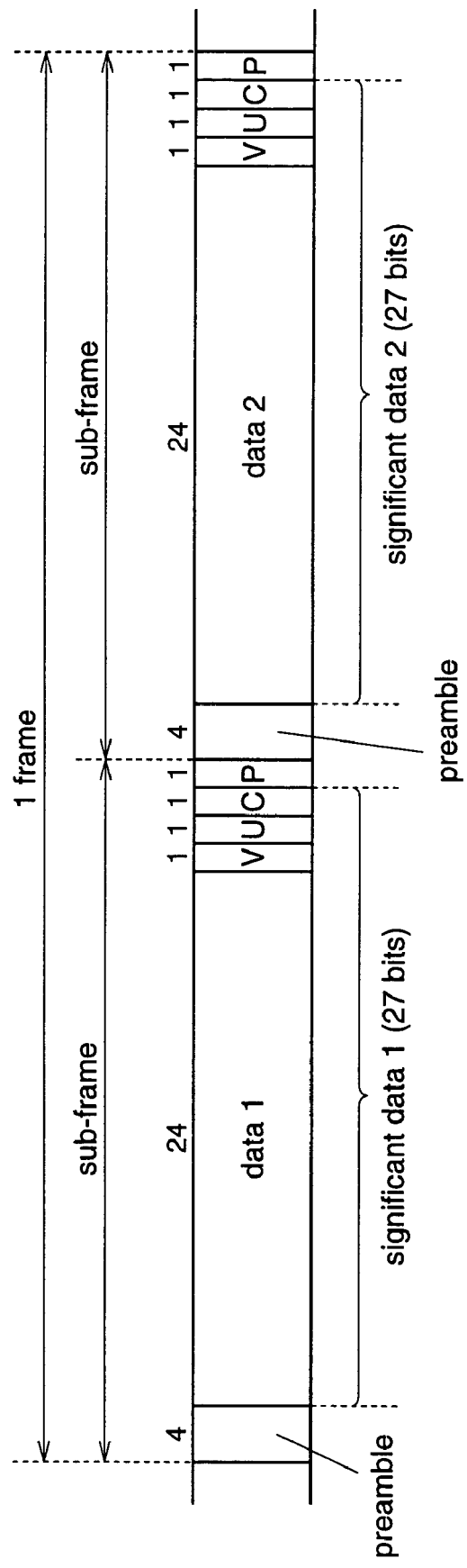
FIG. 20 is a diagram illustrating a packet construction used in a data transmission system according to a seventh embodiment of the present invention.
Figure 20:
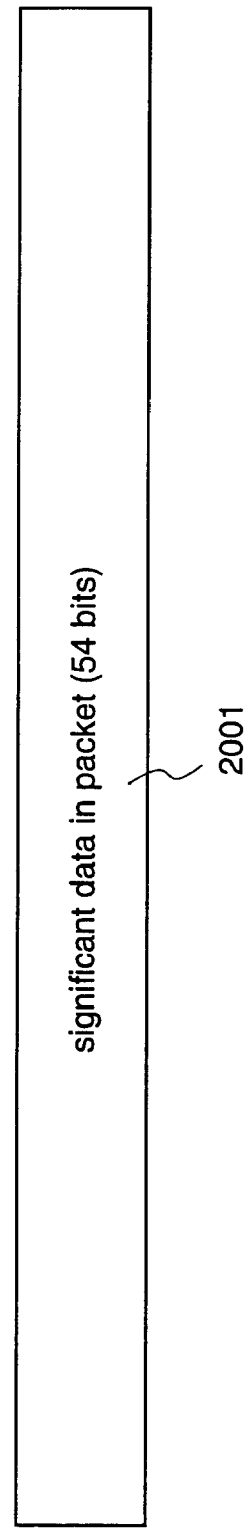

FIG. 20 is a diagram illustrating a packetization of the transmission data frame in this seventh embodiment. In FIG. 20, the transmission data frame construction shown in FIG. 20(*a*) is the same as that shown in the first embodiment. Further, in FIG. 20(*b*), reference numeral 2001 denotes significant data in the packet. In this seventh embodiment, only the significant data of the transmission data frame are extracted and packetized.

A method of transmitting the packetized transmission data frames in this seventh embodiment is shown in FIG. 21. Then, the relationship between the transmission data frame clock and the transmission path frame clock in this seventh embodiment is the same as that in the case of the above-described sixth embodiment, and the relationship between the transmission data frame and the transmission path frame is similar to the relationship in the above-described sixth embodiment. That is, 160 transmission data frames are transmitted using 147 transmission path frames, thereby establishing proper synchronization relationship.

In this seventh embodiment, as shown in FIG. 20(*b*), a transmission data frame of 64 bits is formed into a packet of 54 bits. Thereby, the data amount for 160 frames are 160× 54=8640 bits. The number of frames required for transmitting these using the transmission path frame is 8640/64=135 frames, and in this seventh embodiment, the transmission can be made in a state where 147−135=12 frames are spared.

The transmission data frames each of which has been thus packetized as 54 bits (FIG. 21(*c*)) are sequentially combined (FIG. 21(*b*)) and thereafter are transmitted 64 bits by 64 bits using the transmission path frames (FIG. 21(*a*)). In FIG. 21, the transmission data frames 1,2 . . . are transmitted in the transmission path frames 13,14 . . . respectively in this order, and the transmission of a total of 8640 bits of up to transmission path frame 147, that is, 160 transmission data frames is completed. By repeating these, the transmission data frames are continuously transmitted to the side of the reception apparatus 1520.

Then, in this seventh embodiment, any of the transmission path frames 1 to 12 which have not been used for the transmission of the transmission data frames, or some frames thereof are used to synchronize the transmission apparatus 1510 and the reception apparatus 1520 in receiving packets. For example, the synchronization data 2002 in which each of 64 bits is set to "0" is accommodated in the transmission path frame 12 and when the reception apparatus 1520 detects the transmission path frame 12 including the synchronization data 2002 in which each of 64 bits is set to "0", the reception apparatus 1520 recognizes that a data packet starts from the subsequent frame.

Further, as another example, data to be accommodated in each of 64 bits of the transmission path frame 11 is 1 and data to be accommodated in each of 64 bits of the transmission path frame 12 is 0, and the reception apparatus 1520 recognizes that a data packet starts from a frame detected subsequent to the transmission path frame 11 in which each of 64 bits is set to "1" and the transmission path frame 12 in which each of 64 bits is set to "0".

In this way, according to this seventh embodiment, in a case where while the clock source of the data generation means 1511 and the clock source of the transmission path 100 are the same, the clock rate of the transmission data output from the data generation means 1511 is different from the clock rate of the transmission path 100, that is, in a system where the transmission data frame is transmitted on the basis of 48 kHz and the transmission path frame is transmitted on the basis of 44.1 kHz, the transmission apparatus 1510 creates the transmission path clock from the transmission data clock in the first clock control means 1501, packetizes the frame of the transmission data as 54 bits, and sequentially combines the packetized frames, and thereafter transmits the frames 64 bits by 64 bits using transmission path frame, and the reception apparatus 1520 receives the transmission path frame and the transmission path clock and creates the transmission data clock from the transmission path clock in the second clock control means 1527, and outputs the transmission data to the data processing means 121 on the basis of the transmission data clock, and therefore the synchronized transmission between the transmission apparatus 1510 and the reception apparatus 1520 can be realized.

Then, while in this seventh embodiment the transmission data clock is output from the data generation means to the transmission apparatus and the first clock control means generates the transmission path clock from the transmission data clock, any configuration may be adopted as long as the configuration is one in which the transmission data clock and the transmission path clock are generated from the same clock source as in the above-described sixth embodiment.

Further, a method of packet reception synchronization in this seventh embodiment is an example, and the method is not necessarily restricted thereto. For example, frames other than frames used for synchronization among the transmission path frames 1 to 12 may be used for the transmission of arbitrary data and the like.

Further, while in this seventh embodiment a system operating based on the transmission data frame of 48 kHz and based on the transmission path frame of 44.1 kHz is shown, they are not restricted to these numeric values, and any system is applicable by changing the number of transmission data frames and the number of transmission path frames as long as the system is one in which the clock sources of the transmission data frame and the transmission path frame are common.

Embodiment 8

Next, a data transmission system and data transmission method according to this eighth embodiment will be described. While in each of the above-described embodiments, the system and method in which the transmission apparatus omits data which need not be transmitted using the transmission path, among the transmission data, to generate data packet performing transmission are described, described in this eighth embodiment will be a case where when while the clock of the transmission data is different in rate from the clock of the transmission path in specifications, the clock sources are the same, all the bits of the transmission data are transmitted without omitting unnecessary data. Hereinafter, a description will be made with reference to the drawings. Then, an apparatus configuration in this eighth embodiment is similar to that shown in FIG. 15, and a detailed description is omitted here.

FIG. 22 is a diagram illustrating a method of transmitting transmission data frames in this eighth embodiment. Then, in this eighth embodiment, the transmission data clock is based on 48 kHz and 64 bits (that is, 1 frame) are transmitted in $\frac{1}{48000}$ second. Further, the transmission path clock is based on 44.1 kHz and a transmission path frame for transmitting 72 bits in $\frac{1}{44100}$ second is reserved.

In a transmission system of this eighth embodiment, omission of data included in the transmission data is not performed unlike in the cases of the respective embodiments described above. Further, a transmission path clock is generated using a transmission data clock. Then, in this eighth embodiment, the transmission data clock is based on 48 kHz and the transmission path clock is based on 44.1 kHz, and the transmission path clock is faster than the transmission path clock, and therefore it is necessary that the transmission path frame should be made larger than the transmission data frame. Further, in the transmission system of this eighth embodiment, the synchronization relationship similar to those shown in the above-described sixth and seventh embodiments is established and 160 transmission data frames are transmitted using 147 transmission path frames, thereby establishing proper synchronization relationship.

To be specific, in this eighth embodiment, the transmission data frame of 64 bits obtained by omitting nothing, which is shown in FIG. 22(c), is transmitted. Thereby, the data amount for 160 frames are 160×64=10240 bits. The number of frames required for transmitting these using the transmission path frame is 10240/72=142.22..., and therefore the transmission data for 160 frames can be transmitted by using 143 transmission path frames.

The transmission data frames each of which has been thus obtained by packetizing all the transmission data as 64 bits (FIG. 22(c)) are sequentially combined (FIG. 22(b)), and thereafter are transmitted 72 bits by 72 bits using transmission path frames (FIG. 22(a)). In FIG. 22, the transmission data frames 1,2, ... are transmitted in the transmission path frames 5,6, ... respectively in this order, and the transmission of a total of 10240 bits of up to the transmission path frame 147, that is, 160 transmission data frames are completed. Then, the significant data 2202 of 10240−72×142=16 bits are transmitted in the last transmission path frame 147, and the remaining 56 bits are insignificant data 2203 (refer to FIG. 22(a) and FIG. 22(b)). By repeating these, the transmission data frames are continuously transmitted to the side of the reception apparatus 1520.

Then, in this eighth embodiment, the data for packet synchronization between the transmission apparatus 1510 and the reception apparatus 1520 are accommodated in the transmission path frames 1 to 4 which have not been used for the transmission of the transmission data frames. For example, in the transmission apparatus 1510, all the data of the transmission path frame 1 is set to "1", and the reception apparatus 1520 identifies the transmission path frame in which all the data is set to "1" as the transmission path frame 1 at the time of detecting the transmission path frame, and recognizes that a data packet starts from the transmission path frame 5 which is the fifth frame counting from the transmission path frame 1.

Then, the arbitrary data, for example, user data, or music data in the case of transmitting audio data as significant data, may be accommodated in the transmission path frames 2 to 4 and transmitted.

Figure 23:
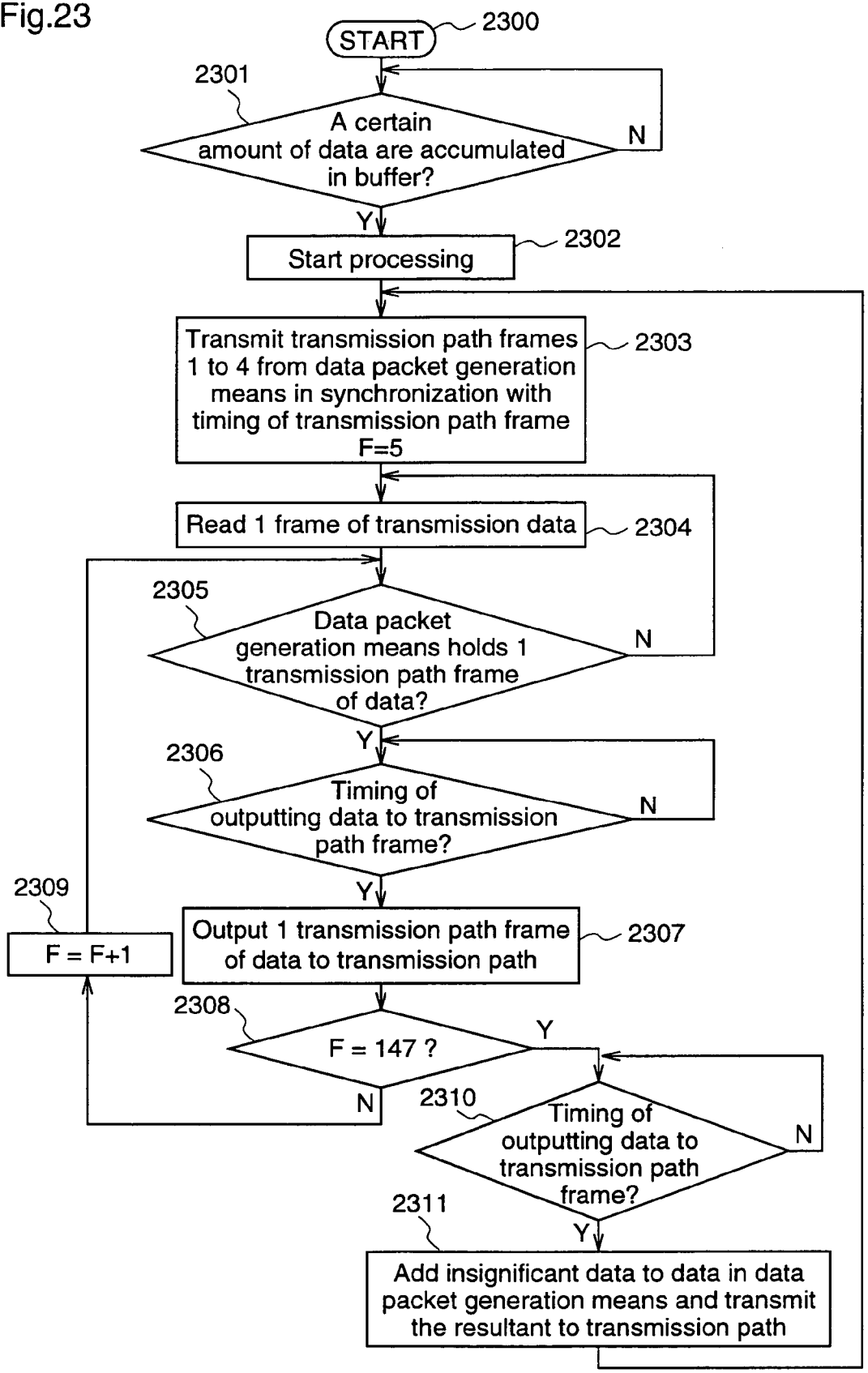
FIG. 23 is a diagram illustrating a process flow chart of the data transmission apparatus according to the eighth embodiment of the present invention.

Hereinafter, the transmission process will be described with reference to the drawings. FIG. 23 is a diagram illustrating a process flow chart of the transmission apparatus in this eighth embodiment. When the flow starts (step 2300), the transmission data are input from the data generation means 1511 to the transmission-side buffer means 114. The transmission-side buffer control means 115 monitors the accumulated data amount in the transmission-side buffer means 114 and, when a certain value, for example, 2 frames of data are accumulated (step 2301), instructs the data packet generation means 1513 to start data output (step 2302). That is, the data packet generation means 1513 initially transmits the transmission path frames 1 to 4 in synchronization with the timing of the transmission path clock (step 2303). Then, the data packet generation means 1513 reads 1 frame of data from the transmission-side buffer means (step 2304). Then, when the data packet generation means 1513 does not hold data for 1 transmission path frame, that is, data of 72 bits in this eighth embodiment, which are to be subsequently transmitted (step 2305), the process returns to step 2304, and 1 frame of transmission data are read from the transmission-side buffer means 114.

Then, when the timing of outputting data to the transmission path frame comes (step 2306), 1 transmission path frame of data, that is, 72 bits of data in this eighth embodiment, are output to the transmission path (step 2307). Then, processes of step 2305 to step 2307 are repeated until the data packet generation means 1513 outputs the transmission path frame 146 in FIG. 22 (step 2308), and when the timing of outputting data to the transmission path frame comes (step 2310), the insignificant data of 56 bits are added to the last 16 bits of data in the transmission data frame 160 and the resultant is transmitted as the transmission path frame 147 (step 2311). Then, the output of the transmission path frame 147 is completed (step 2308), and then the processes of step 2303 to step 2311 are repeated. Thereby, packets are continuously transmitted.

Figure 24:
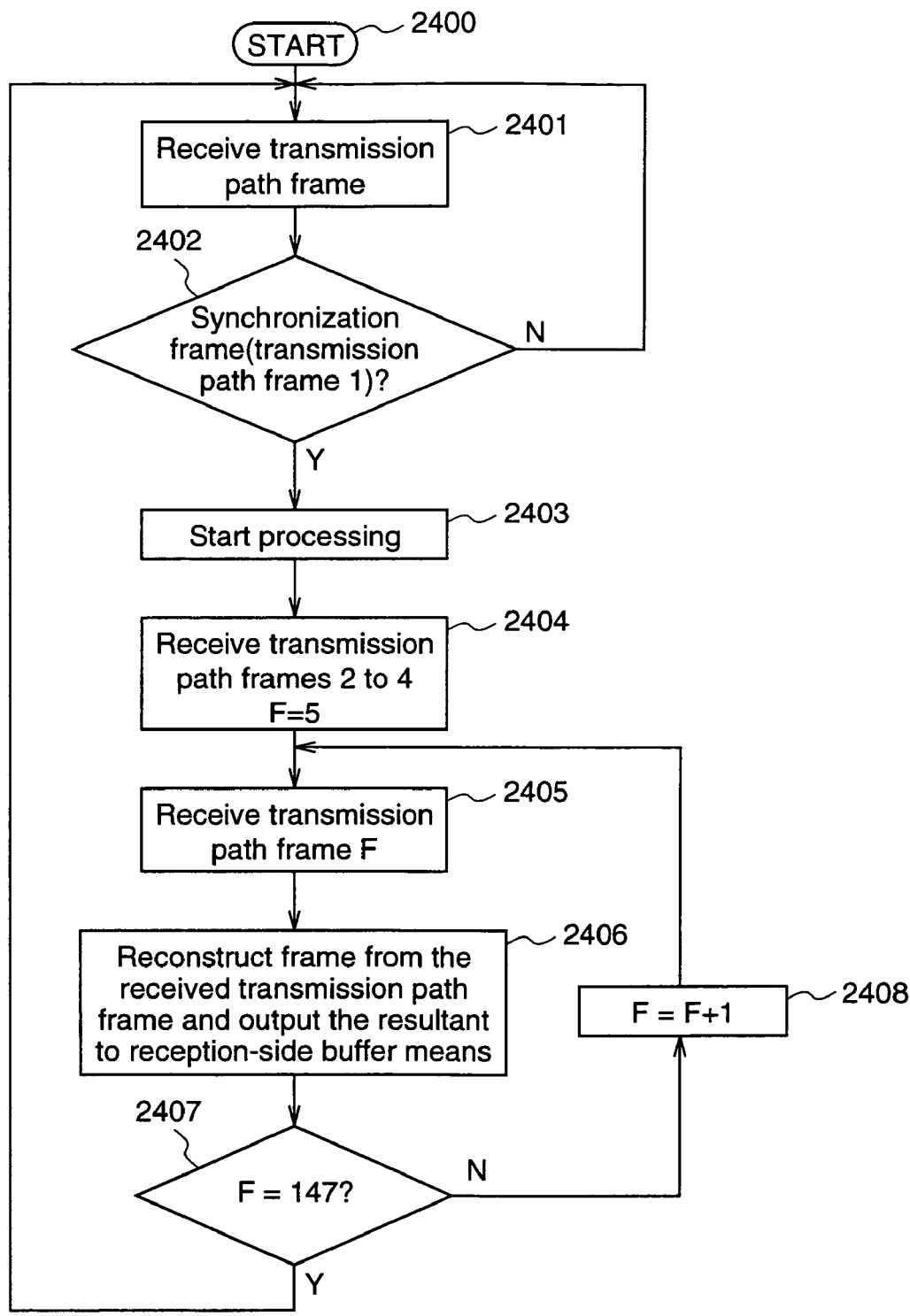
FIG. 24 is a diagram illustrating a process flow chart of the data reception apparatus according to the eighth embodiment of the present invention.

FIG. 24 is a diagram illustrating a process flow chart of the reception apparatus in this eighth embodiment. When the flow starts (step 2400), the reception apparatus 1520 receives the transmission path frame (step 2401), and when the data of the transmission path frame include synchronization data indicating transmission path frame 1 (step 2402), the process is started (step 2403). Subsequently, the data extraction means 1523 receives the transmission path frame 2 to transmission path frame 4 subsequent to the transmission path frame 1 (step 2404), and the data extraction means 1523 subsequently receives the transmission path frame (step 2405). Then, the data extraction means 1523 reconstructs the transmission data frame from the received transmission path frame, and outputs the reconstructed frame to the reception-side buffer means 1524 (step 2406). Then, processes of step 2405 to step 2406 are repeated until the transmission path frame 147 in FIG. 22 is received, and the process of the transmission path frame 147 is completed (step 2407), and then processes of step 2401 to step 2408 are repeated. Then, the insignificant bits 2203 which have been added by the transmission apparatus 1510 are discarded from the transmission path frame 147 (refer to FIG. 22(*a*)).

Then, data accumulated in the reception-side buffer 1524 are read with the same clock as the transmission data clock in the transmission apparatus 1510, and are transmitted to the data processing means 121.

In this way, according to this eighth embodiment, in a case where while the clock source of the data generation means 1511 and the clock source of the transmission path 100 are the same, the clock rate of the transmission data output from the data generation means 1511 is different from the clock rate of the transmission path 100, that is, in a system operating based on the transmission data clock of 48 kHz and the transmission path clock of 44.1 kHz, the transmission apparatus 1510 creates the transmission path clock from the transmission data clock in the first clock control means 1501, and sequentially combines the transmission data frames and thereafter transmits the frames 72 bits by 72 bits with using the transmission path frame, and the reception apparatus 1520 receives the transmission path frame and the transmission path clock and creates the transmission data clock from the transmission path clock in the second clock control means 1527, and outputs the transmission data to the data processing means 121 on the basis of the transmission data clock, and therefore the synchronized transmission between the transmission apparatus 1510 and the reception apparatus 1520 can be realized. Further, in this eighth embodiment, since the transmission data is not omitted and all the data are transmitted, the processes in the data packet generation means 1513 on the side of the transmission apparatus 1510, or the processes in the data extraction means on the side of the reception apparatus 1520 are reduced.

Then, while in this eighth embodiment the transmission data clock is output from the data generation means 1511 to the transmission apparatus 1510 and the first clock control means generates the transmission path clock, any configuration may be adopted as long as the configuration is one in which the transmission data clock and the transmission path clock are generated from the same clock source. For example, the configuration may be one in which the first clock control means exists in another apparatus on the transmission path 100, and in this case, the data generation means 1511 receives the transmission path clock generated by the first clock control means 1501 in the other apparatus, and generates the transmission data clock from the received transmission path clock.

Further, while in this eighth embodiment each of 64 bits of the transmission path frame 1 accommodates "1", it is not necessarily restricted to this value. For example, a frame other than the transmission path frame 1 may be for synchronization, or a plurality of frames may be used for synchronization. Further, only one or more bits of the frame may be used as a mark for the synchronization data 2201, and the other bits may be used for another purpose, for example, for arbitrary data.

Further, while shown in this eighth embodiment is a system where the transmission data frame is transmitted on the basis of 48 kHz and the transmission path frame is transmitted on the basis of 44.1 kHz, they are not restricted to these numeric values, and any system is applicable by changing the number of transmission data frames and the number of transmission path frames as long as the system is one in which the clock sources of the transmission data frame and the transmission path frame are common. For example, in a system where the transmission data frame is transmitted on the basis of 48 kHz and the transmission path frame is transmitted on the basis of 44.1 kHz, the synchronization relationship that while 147 transmission data frames are input, 160 transmission path frames are transmitted, is established, and therefore in a case where when the data for 1 transmission path frame are of 64 bits, a transmission path for transmitting 64 bits in $\frac{1}{48000}$ second is reserved, data can be transmitted using 147 transmission path frames and the remaining 13 transmission path frames can be used for the transmission of synchronization data 2201 and arbitrary data.

Embodiment 9

Next, a data transmission system and data transmission method according to this ninth embodiment will be described. This ninth embodiment is characterized in that a method at the transmission to the transmission path is different from that of the above-described eighth embodiment. Hereinafter, a description will be made with reference to the drawings. Then, an apparatus configuration in this ninth embodiment is similar to that shown in FIG. 15, and the detailed description is omitted here.

FIG. 25 is a diagram illustrating a method of transmitting transmission data frames in this ninth embodiment. Then, in this ninth embodiment, the relationship between the clock of the transmission data and the clock of the transmission path frame is the same as that of the above-described eighth embodiment. That is, 160 transmission data frames are transmitted with using 147 transmission path frames, thereby establishing proper synchronization relationship.

In this ninth embodiment, as shown in FIG. 25(*a*), 1 bit of dummy data 2502 is added to the heads of the transmission path frames other than the transmission path frames including synchronization data 2501. The dummy data 2502 is for discriminating between the transmission path frames and the transmission path frames including synchronization data 2501 in the reception apparatus 1520.

Then, in this ninth embodiment, all the bits of the synchronization data 2501 are set to "1" and the dummy data 2502 is set to "0". By such definition, there arises no cases where all the bits of the transmission path frames other than the transmission path frames including the synchronization data 2501 are set to "1", an erroneous detection of the transmission path frames including the synchronization data 2501 is eliminated, thereby performing more reliable transmission.

To be specific, in this ninth embodiment, 64 bits of transmission data frame obtained by omitting nothing, which is shown in FIG. 25(*c*), are transmitted. Hence, the data amount for 160 frames are 160×64=10240 bits. The number of frames required for transmitting these with using the transmission path frame is 10240/71=144.25 . . . since bits other than 1 bit of dummy data 2502 are used for transmission of the significant data 2503, and therefore 160 frames of transmission data can be transmitted by using 145 transmission path frames.

The transmission data frames, each of which is thus obtained by packetizing as 64 bits all the transmission data (FIG. 25(*c*)), are sequentially combined (FIG. 25(*b*)), and thereafter are transmitted 71 bits by 71 bits with using the transmission path frame (FIG. 25(*a*)). In FIG. 25, the transmission data frames 1,2, . . . are transmitted in the transmission path frames 3,4, . . . respectively in this order, and the transmission of a total of 10240 bits of up to the transmission path frame 147, that is, 160 transmission frames, is completed. Then, the significant data 2503 of 10240−71×144=16 bits are transmitted in the last transmission path frame 147, and the remaining 55 bits are insignificant data 2504 (refer to FIG. 25(*a*) and FIG. 25(*b*)). By repeating these, the transmission data frames are continuously transmitted to the side of the reception apparatus 1520.

Then, the arbitrary data, for example, user data, the music data in the case of transmitting audio data as significant data, or the like, may be accommodated in the transmission path frame 2 and transmitted.

In this way, according to this ninth embodiment, in a system operating based on the transmission data clock of 48 kHz and the transmission path clock of 44.1 kHz, the transmission apparatus 1510 creates the transmission path clock from the transmission data clock in the first clock control means 1501, sequentially combines the transmission data frames and thereafter transmits the frames 71 bits by 71 bits, which are added to 1 bit of dummy data, by using the transmission path frame, and the reception apparatus 1520 receives the transmission path frame and the transmission path clock, and creates the transmission data clock from the transmission path clock in the second clock control means 1527, and outputs the transmission data to the data processing means 121 on the basis of the transmission data clock, thereby realizing the synchronized transmission between the transmission apparatus 1510 and the reception apparatus 1520.

Then, also in this ninth embodiment, as in the above-described eighth embodiment, any configuration may be adopted as long as the configuration is one in which the transmission data clock and the transmission path clock are generated from the same clock source.

Further, a method of packet reception synchronization in this ninth embodiment is an example, and the method is not necessarily restricted thereto. For example, the transmission path frame 2 may be used for the transmission of arbitrary data. Further, it is not necessary that the whole transmission path frame 1 accommodate the synchronization data, and a portion of bits of the transmission path frame are used for the transmission of the synchronization data, and the other bits may be used for another purpose, for example, for the transmission of arbitrary data and the like.

Further, while in this ninth embodiment a system where the transmission data frame is transmitted on the basis of 48 kHz and the transmission path frame is transmitted on the basis of 44.1 kHz is shown, they are not restricted to these numeric values, and any system is applicable by changing the number of transmission data frames and the number of transmission path frames as long as the system is one in which the clock sources of the transmission data frame and the transmission path frame are common.

Further, a method of preventing an erroneous detection of the transmission path frame including the synchronization data which is used in this ninth embodiment, is also applicable to the above-described sixth embodiment or seventh embodiment. For example, when the above-described method of preventing an erroneous detection is applied to the above-described seventh embodiment, 63 bits among 64 bits which are reserved in each of the transmission path frames for transmitting the significant data 2001 in FIG. 21 are used for transmitting the significant data 2001, and 1 bit is used as dummy data. At this time, since 8640÷63=137.14 . . . , 138 transmission path frames, that is, transmission path frame 10 to transmission path frame 147, are used for the transmission of the significant data 2001. Only 8640−63×137=9 bits are transmitted in the last transmission path frame 147, and the remaining 54 bits (=63−9) are insignificant data. Also in this case, the transmission path frame 1 is used as a frame including synchronization data 2002, and the transmission path frame 2 to transmission path frame 9 may be used for the transmission of user data in a like manner. Then, in this case, the first 1 bit of each of the transmission path frame 2 to transmission path frame 9 is the dummy data and the remaining 63 bits are used for the transmission of the user data.

Further, while in the above-described first to ninth embodiments, cases where IEC60958 is used as a format of the transmission data and MOST is used as transmission path 100 are described, also when another transmission data format or another transmission path is used, they are applicable in a like manner.

Further, the numeric values used in the above-described first to ninth embodiments are examples, and the numeric values are not restricted to these values in actual operation.

Further, the packet formats shown in the above-described first to seventh embodiments are examples, and the location of each field on the packet and the like can be arbitrarily changed.

Further, the number of transmission path frames including the synchronization data shown in FIG. 17, FIG. 21, FIG. 22, and FIG. 25 in the above-described sixth to ninth embodiments or the location of the dummy data on the transmission path frame shown in FIG. 25 in the above-described ninth embodiment is an example, and they can be arbitrarily changed.

Further, while in the above-described first to ninth embodiments, the configurations in which the data generation means exist outside the transmission apparatus are shown, the present invention can be similarly realized in a configuration in which the data generation means is included in the transmission apparatus.

Further, while in these first to ninth embodiments, the configurations in which the data processing means exist outside the reception apparatus are shown, the present invention can be similarly realized in a configuration in which the data processing means is included in the reception apparatus.

Further, while in these first to seventh embodiments, the preamble and parity portions are omitted in the transmission apparatus, a format in which one of them, for example, a parity, is not omitted may be transmitted to the reception apparatus. Further, the configuration may be one where when fields other than these, which are not used in the transmission, are present, the transmission apparatus can omit the fields similarly to increase spare bits.

Further, while in these first to seventh embodiments, 1 frame of transmission data is used as a processing unit, the present invention can be similarly realized also when a plurality of frames are used as a processing unit.

A data transmission system as well as data transmission method, data transmission apparatus and data reception apparatus according to the present invention are useful as a system, method and apparatuses which can maintain synchronization between the transmission and reception even when the transmission apparatus, the reception apparatus and the transmission path do not operate on the same clock.

The invention claimed is:

1. A data transmission system comprising a transmission apparatus and a reception apparatus, the transmission apparatus and the reception apparatus being connected via a transmission path, and data being transmitted from the transmission apparatus to the reception apparatus in an access unit that appears at a certain time interval and is allocated for the transmission path, wherein the transmission apparatus comprises a data packet generation means for:

receiving transmission data (i) composed of consecutive data frames and (ii) having, for at least one data frame, a format that includes at least one of a preamble indicating a start of the data frame and a parity for detecting an error in the data frame;

omitting the at least one of the preamble and the parity from one or more data frames included in the transmission data received within the certain time interval;

adding, to one or more data frames (i) included in the received transmission data and (ii) having the at least one of the preamble and the parity omitted therefrom, a data length field indicating a number of bits of significant data;

setting a remaining spare portion, of a data packet generated by the data packet generation means, as spare bits; and adjusting a length of the spare bits according to a difference between a clock rate used by the transmission apparatus and a clock rate used by the transmission path, to generate the data packet, including the one or more data frames, the data length field and the adjusted spare bits, as the access unit that is an entire length of the generated data packet, and wherein the reception apparatus comprises a data extraction means for receiving the access unit, and for adding, to the generated data packet of the received access unit, the at least one of the preamble and the parity omitted by the data packet generation means, to reconstruct the one or more data frames included in the transmission data received by the data packet generation means.

2. The data transmission system as defined in claim 1, wherein the reception apparatus comprises:

a buffer means for temporarily accumulating the one or more data frames reconstructed by the data extraction means; and a buffer control means for monitoring an amount of accumulated data accumulated in the buffer means and adjusting a data reading rate of the buffer means according to an increase or decrease in the amount of accumulated data.

3. The data transmission system as defined in claim 1, wherein the transmission apparatus comprises a time-information generation means for generating, as time information, a time that is based on a clock of the transmission data, wherein the data packet generation means adds, to the one or more data frames included in the received transmission data and having the at least one of the preamble and the parity omitted therefrom, the generated time information, and sets the remaining spare portion as spare bits, and wherein the reception apparatus comprises:

a buffer means for temporarily accumulating the one or more data frames reconstructed by the data extraction means;

a clock control means for reproducing the time information generated by the time-information generation means, the time information being obtained by the data extraction means from the access unit received from the data packet generation means; and a buffer control means for adjusting a data reading rate of the buffer means based on a clock synchronized with the generated time represented by the time information reproduced by the clock control means.

4. The data transmission system as defined in claim 1, wherein, the data packet generation means (i) adds, to the one or more data frames included in the received transmission data and having the at least one of the preamble and the parity omitted therefrom, a preamble location pointer indicating a location of a first preamble in the one or more data frames, and a type of the first preamble, the first preamble being indicated by the preamble location pointer and the data length field, and (ii) sets the remaining spare portion as spare bits.

5. The data transmission system as defined in claim 1,
wherein, the transmission data format includes, for at least one data frame, a specific field having a value specific to an application, wherein the data packet generation means omits the specific field from the one or more data frames, and wherein the data extraction means adds, to the generated data packet of the received access unit, the specific field, to reconstruct the one or more data frames included in the transmission data received by the data packet generation means.

6. The data transmission system as defined in claim 1, wherein the data length field indicates a number of bits of the spare bits.

7. A data transmission system comprising a transmission apparatus and a reception apparatus, the transmission apparatus and the reception apparatus being connected via a transmission path, and data being transmitted from the transmission apparatus to the reception apparatus in an access unit that appears at a certain time interval and is allocated for the transmission path, wherein the transmission apparatus comprises a data packet generation means for:

receiving transmission data (i) composed of consecutive data frames and (ii) having a data transfer rate that is established from an integer ratio related to a data transfer rate allocated for the transmission path;

making a plurality of data frames from the received transmission data, the plurality of data frames forming a processing unit, and the plurality of data frames having a time length that corresponds to an integer multiple of the time interval at which the access unit appears; and dividing data comprised of the data frames of the processing unit into an amount of data that can be accommodated in the access unit, to form the data of the access unit from the divided data and wherein the reception apparatus comprises a data extraction means for receiving one or more access units, reconstructing the processing unit from the data of the one or more received access units, and reconstructing, from the data of the reconstructed processing unit, the consecutive data frames of the transmission data.

8. The data transmission system as defined in claim 7, wherein the data packet generation means adds one or more bits of synchronization data indicating a start of the processing unit to one or more access units, and wherein the data extraction means detects the start of the processing unit by receiving the synchronization data.

9. The data transmission system as defined in claim 8, wherein the data packet generation means adds, into a position in the access unit that the synchronization is not added, one or more bits of discrimination data, the one or more bits of the discrimination data being different from a value of the synchronization data, and the discrimination data indicating that the synchronization data is not included in the access unit.

10. A data transmission system comprising a transmission apparatus and a reception apparatus, the transmission apparatus and the reception apparatus being connected via a transmission path, and data being transmitted from the transmission apparatus to the reception apparatus in an access unit that appears at a certain time interval and is allocated for the transmission path, wherein the transmission apparatus comprises a data packet generation means for:

receiving transmission data (i) composed of consecutive data frames, (ii) having a data transfer rate that is established from an integer ratio related to a data transfer rate allocated for the transmission path, and (iii) having, for at least one data frame, a format that includes at least one of a preamble indicating a start of the data frame and a parity for detecting an error in the data frame;

omitting the at least one of the preamble and the parity from each data frame of the plurality of data frames that have a time length that corresponds to an integer multiple of the time interval at which the access unit appears;

forming a processing unit from the data frames included in the received transmission data and having the at least one of the preamble and the parity omitted therefrom; and dividing data comprised of the data frames of the processing unit into an amount of data that can be accommodated in the access unit, to form the data of the access unit from the divided data, and wherein the reception apparatus comprises a data extraction means for receiving one or more access units, for reconstructing the processing unit from the data of the one or more received access units, and for adding, to the reconstructed processing unit, the at least one of the preamble and the parity omitted by the data packet generation means, to reconstruct the data frames included in the transmission data received by the data packet generation means.

11. The data transmission system as defined in claim 10, wherein the data packet generation means adds one or more bits of synchronization data indicating a start of the processing unit to one or more access units, and wherein the data extraction means detects the start of the processing unit by receiving the synchronization data.

12. The data transmission system as defined in claim 11, wherein the data packet generation means adds, into a position in the access unit that the synchronization is not added, one or more bits of discrimination data, the one or more bits of the discrimination data being different from a value of the synchronization data, and the discrimination data indicating that the synchronization data is not included in the access unit.

13. The data transmission system as defined in claim 10, wherein the transmission data format includes a specific field having a value specific to an application, wherein the data packet generation means omits the specific field from each data frame of the plurality of data frames that have the time length that corresponds to the integer multiple of the time interval at which the access unit appears, and wherein the data extraction means adds, to the reconstructed processing unit, the specific field, to reconstruct the data frames included in the transmission data received by the data packet generation means.

14. The data transmission system as defined in claim 1, wherein the transmission data format is a format defined by IEC60958-1 First Edition 1999-12.

15. The data transmission system as defined in claim 1, wherein the transmission path is a serial bus.

16. A data transmission apparatus connected to a transmission path that transmits data in an access unit allocated for the transmission path, the data transmission apparatus comprising a data packet generation means for:

receiving transmission data (i) composed of consecutive data frames and (ii) having, for at least one data frame, a format that includes at least one of a preamble indicating a start of the data frame and a parity for detecting an error in the data frame;

omitting the at least one of the preamble and the parity from one or more data frames included in the transmission data transmitted in the access unit;

adding, to one or more data frames (i) included in the received transmission data and (ii) having the at least one of the preamble and the parity omitted therefrom, a data length field indicating a number of bits of significant data;

setting a remaining spare portion, of a data packet generated by the data packet generation means, as spare bits; and adjusting a length of the spare bits according to a difference between a clock rate used by the transmission apparatus and a clock rate used by the transmission path, to generate the data packet, including the one or more data frames, the data length field and the adjusted spare bits, as the access unit that is an entire length of the generated data packet.

17. The data transmission apparatus as defined in claim 16, wherein the data transmission apparatus comprises a time-information generation means for generating, as time information, a time that is based on a clock of the transmission data, and wherein the data packet generation means adds, to the one or more data frames included in the received transmission data and having the at least one of the preamble and the parity omitted therefrom, the generated time information, and sets the remaining spare portion as spare bits.

18. The data transmission apparatus as defined in claim 16, wherein the data packet generation means (i) adds, to the one or more data frames included in the received transmission data and having the at least one of the preamble and the parity omitted therefrom, a preamble location pointer indicating a location of a first preamble in the one or more data frames, and a type of the first preamble, the first preamble being indicated by the preamble location pointer and the data length field, and (ii) sets the remaining spare portion as spare bits.

19. The data transmission apparatus as defined in claim 16, wherein the transmission data format includes, for at least one data frame, a specific field having a value specific to an application, and wherein the data packet generation means omits the specific field from the one or more data frames.

20. The data transmission apparatus as defined in claim 16, wherein the data length field indicates a number of bits of the spare bits.

21. A data transmission apparatus connected to a transmission path to which a reception apparatus is connected, the data transmission apparatus transmitting data in an access unit that appears at a certain time intervals and is allocated for the transmission path, the data being transmitted to the reception apparatus, the data transmission apparatus comprising a data packet generation means for:

receiving transmission data (i) composed of consecutive data frames and (ii) having a data transfer rate that is established from an integer ratio related to a data transfer rate allocated for the transmission path, making a plurality of data frames from the received transmission data, the plurality of data frames forming a processing unit, and the plurality of data frames having a time length that corresponds to an integer multiple of the time interval at which the access unit appears; and dividing data comprised of the data frames of the processing unit into an amount of data that can be accommodated in the access unit to form the data of the access unit from the divided data.

22. The data transmission apparatus as defined in claim 21, wherein the data packet generation means adds one or more bits of synchronization data indicating a start of the processing unit to one or more access units.

23. The data transmission apparatus as defined in claim 22, wherein the data packet generation means adds, into a position in the access unit that the synchronization is not added, one or more bits of discrimination data, the one or more bits of discrimination data being different from a value of the synchronization data, and the discrimination data indicating that the synchronization data is not included in the access unit.

24. A data transmission apparatus connected to a transmission path that transmits data in an access unit that appears at a certain time interval and is allocated for the transmission path, the data transmission apparatus comprising a data packet generation means for:

receiving transmission data (i) composed of consecutive data frames, (ii) having a data transfer rate that is established from an integer ratio related to a data transfer rate allocated for the transmission path, and (iii) having, for at least one data frame, a format that includes at least one of a preamble indicating a start of the data frame and a parity for detecting an error in the data frame;

omitting the at least one of the preamble and the parity from each data frame of the plurality of data frames that have a time length that corresponds to an integer multiple of the time interval at which the access unit appears;

forming a processing unit from the data frames included in the received transmission data and having the at least one of the preamble and the parity omitted therefrom; and dividing data comprised of the data frames of the processing unit into an amount of data that can be accommodated in the access unit, to form the data of the access unit from the divided data.

25. The data transmission apparatus as defined in claim 24, wherein the data packet generation means adds one or more bits of synchronization data indicating a start of the processing unit to one or more access units.

26. The data transmission apparatus as defined in claim 25, wherein the data packet generation means adds, into a position in the access unit that the synchronization is not added, one or more bits of discrimination data, the one or more bits of discrimination data being different from a value of the synchronization data, and the discrimination data indicating that the synchronization data is not included in the access unit.

27. The data transmission apparatus as defined in claim 24, wherein the transmission data format includes a specific field having a value specific to an application, and wherein the data packet generation means omits the specific field from each data frame of the plurality of data frames that have the time length that corresponds to the integer multiple of the time interval at which the access unit appears.

28. The data transmission apparatus as defined in claim 16, wherein the transmission data format is a format defined by IEC60958-1 First Edition 1999-12.

29. The data transmission apparatus as defined in claim 16, wherein the transmission path is a serial bus.

30. A data reception apparatus that is connected to a transmission path and that receives, from a transmission apparatus, a data packet generated by (i) omitting at least one of a preamble indicating a start of a data frame and a parity for detecting an error in the data frame, from one or more data frames included in transmission data and transmitted in an access unit that appears at a certain time interval and is allocated for the transmission path, (ii) adding, to one or more data frames included in the transmission data and having the at least one of the preamble and the parity omitted therefrom, a data length field indicating a number of bits of significant data, (iii) setting a remaining spare portion of the data packet as spare bits, and (iv) adjusting a length of the spare bits according to a difference between a clock rate used by the transmission apparatus and a clock rate used by the transmission path, to generate the data packet, including the one or more data frames, the data length field and the adjusted spare bits, as the access unit that is an entire length of the generated data packet, the data reception apparatus comprising a data extraction means for receiving the access unit and for adding, to the generated data packet of the received access unit, the at least one of the preamble and the parity omitted from the one or more data frames, to reconstruct the one or more data frames included in the transmission data.

31. The data reception apparatus as defined in claim 30, comprising:

a buffer means for temporarily accumulating the one or more data frames reconstructed by the data extraction means; and a buffer control means for monitoring an amount of accumulated data accumulated in the buffer means and adjusting a data reading rate of the buffer means according to an increase or decrease in the amount of accumulated data.

32. The data reception apparatus as defined in claim 30, comprising:

a buffer means for temporarily accumulating the one or more data frames reconstructed by the data extraction means;

a clock control means for reproducing a time from time information obtained by the data extraction means from the received access unit; and a buffer control means for adjusting a data reading rate of the buffer means based on a clock synchronized with the time reproduced by the clock control means.

33. A data reception apparatus that is connected to a transmission path and that receives, from a transmission apparatus, data transmitted in an access unit that appears at a certain time interval and is allocated for the transmission path, the data reception apparatus comprising a data extraction means for:

receiving the access unit obtained by (i) omitting at least one of a preamble indicating a start of a data frame and a parity for detecting errors in the data frame, from each data frame of a plurality of data frames included in transmission data received by the transmission apparatus that have a time length that corresponds to an integer multiple of the time interval at which the access unit appears, (ii) forming a processing unit from the data frames included in the transmission data and having the at least one of the preamble and the parity omitted therefrom, and (iii) dividing data comprised of the data frames of the processing unit into an amount of data that can be accommodated in the access unit;

reconstructing the processing unit from the data of the received access unit; and adding, to the reconstructed processing unit, the at least one of the preamble and the parity omitted from each data frame, to reconstruct the data frames included in the transmission data.

34. The data reception apparatus as defined in claim 33, wherein the data extraction means detects a start of the processing unit by receiving one or more access units including one or more bits of synchronization data indicating the start of the processing unit.

35. The data reception apparatus as defined in claim 30, wherein the transmission data format includes a specific field having a value specific to an application, and
wherein the data extraction means adds the specific field to the data of the received access unit.

36. The data reception apparatus as defined in claim 30, wherein the transmission data format is a format defined by IEC60958-1 First Edition 1999-12.

37. The data reception apparatus as defined in claim 30, wherein the transmission path is a serial bus.

38. A data transmission method comprising:
a data packet generation step of:
omitting at least one of a preamble indicating a start of a data frame and a parity for detecting an error in the data frame from one or more data frames included in transmission data (i) composed of consecutive data frames and (ii) having, for at least one data frame, a format that includes the at least one of the preamble and the parity;

adding, to one or more data frames (i) included in the received transmission data and (ii) having the at least one of the preamble and the parity omitted therefrom, a data length field indicating a number of bits of significant data;

setting a remaining spare portion, of the data packet to be generated, as spare bits;

adjusting a length of the spare bits according to a difference between a clock rate used by a transmission apparatus that transmits the generated data packet on a transmission path and a clock rate used by the transmission path;

generating the data packet including the one or more data frames, the data length field and the adjusted spare bits, the data packet being generated as an access unit, and the access unit being allocated for the transmission path over an entire length of the generated data packet; and a data extraction step of receiving the access unit and adding, to the generated data packet of the received access unit, the at least one of the preamble and the parity omitted in the data packet generation step, to reconstruct the one or more data frames included in the transmission data.

39. The data transmission method as defined in claim 38, wherein the transmission data format includes, for at least one data frame, a specific field having a value specific to an application,
wherein the data packet generation step omits the specific field from the one or more data frames, and
wherein the data extraction step adds, to the generated data packet of the received access unit, the specific field, to reconstruct the one or more data frames included in the transmission data.

40. A data transmission method of using a transmission system, which includes a transmission apparatus and a reception apparatus, for transmitting data in an access unit that appears at a certain time interval, the access unit being allocated to a transmission path, the data transmission method comprising:
a data packet generation step of:
receiving transmission data (i) composed of consecutive data frames and (ii) having a data transfer rate that is established from an integer ratio related to a data transfer rate allocated for the transmission path;

making a plurality of data frames from the received transmission data, the plurality of data frames forming a processing unit, and the plurality of data frames having a time length that corresponds to an integer multiple of the time interval at which the access unit appears and; and dividing data comprised of the data frames of the processing unit into an amount of data that can be accommodated in the access unit, to form the data of the access unit from the divided data; and a data extraction step of receiving the one or more access units, reconstructing the processing unit from the data of the one or more received access units, and reconstructing, from the data of the reconstructed processing unit, the consecutive data frames of the transmission data.

41. A data transmission method of using a transmission system, which includes a transmission apparatus and a reception apparatus, for transmitting data in an access unit that appears at a certain time interval, the access unit being allocated to a transmission path, and the data transmission method comprising:
a data packet generation step of:
receiving transmission data (i) composed of consecutive data frames, (ii) having a data transfer rate that is established from an integer ratio related to a data transfer rate allocated for the transmission path, and (iii) having, for at least one data frame, a format that includes at least one of a preamble indicating a start of the data frame and a parity for detecting an error in the data frame;

omitting the at least one of the preamble and the parity from each data frame of the plurality of data frames that have a time length that corresponds to an integer multiple of the time interval at which the access unit appears;

forming a processing unit from the data frames included in the received transmission data and having the at least one of the preamble and the parity omitted therefrom; and dividing data comprised of the data frames of the processing unit into an amount of data that can be accommodated in the access unit to form the data of the access unit from the divided data; and a data extraction step of receiving one or more access units, reconstructing the processing unit from the data of the one or more received access units, adding, to the reconstructed processing unit, the at least one of the preamble and the parity omitted in the data packet generation step, to reconstruct the data frames included in the transmission data.

42. The data transmission method as defined in claim 41,
wherein the transmission data format includes a specific field having a value specific to an application,
wherein the data packet generation step omits the specific field from each data frame of the plurality of data frames that have the time length that corresponds to the integer multiple of the time interval at which the access unit appears, and
wherein the data extraction step adds, to the reconstructed processing unit, the specific field, to reconstruct the data frames included in the transmission data received by the data packet generation means.

43. The data transmission system as defined in claim 10, wherein the transmission data format is a format defined by IEC60958-1 First Edition 1999-12.

44. The data transmission system as defined in claim 7, wherein the transmission path is a serial bus.

45. The data transmission system as defined in claim 10, wherein the transmission path is a serial bus.

46. The data transmission apparatus as defined in claim 24, wherein the transmission data format is a format defined by IEC60958-1 First Edition 1999-12.

47. The data transmission apparatus as defined in claim 21, wherein the transmission path is a serial bus.

48. The data transmission apparatus as defined in claim 24, wherein the transmission path is a serial bus.

49. The data reception apparatus as defined in claim 33,
wherein the transmission data format includes a specific field having a value specific to an application, and
wherein the data extraction means adds the specific field to the reconstructed processing unit.

50. The data reception apparatus as defined in claim 33, wherein the transmission data format is a format defined by IEC60958-1 First Edition 1999-12.

51. The data reception apparatus as defined in claim 33, wherein the transmission path is a serial bus.

* * * * *